(12) United States Patent
Kobayashi

(10) Patent No.: US 9,061,525 B2
(45) Date of Patent: Jun. 23, 2015

(54) IMAGE FORMING METHOD

(71) Applicant: FUJIFILM CORPORATION, Tokyo (JP)

(72) Inventor: Masaru Kobayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 198 days.

(21) Appl. No.: 13/774,990

(22) Filed: Feb. 22, 2013

(65) Prior Publication Data
US 2013/0222502 A1     Aug. 29, 2013

(30) Foreign Application Priority Data

Feb. 29, 2012   (JP) .................. 2012-044600

(51) Int. Cl.
*B41J 11/00*     (2006.01)
*B41M 7/00*     (2006.01)
(Continued)

(52) U.S. Cl.
CPC .......... *B41J 11/0015* (2013.01); *B41M 7/0081* (2013.01); *B41M 5/0017* (2013.01);
(Continued)

(58) Field of Classification Search
CPC .............. B41J 2/01; B41J 2/17; B41J 2/2107; B41J 11/0015; B41J 11/002; C09D 11/30; C09D 11/322; C09D 11/38; C09D 11/40; C09D 11/54; C09D 11/101; C09D 11/005; B41M 5/0017; B41M 7/0081; B41M 7/009
USPC ............. 347/95–105; 106/31.6, 31.13, 31.27; 523/160, 161
See application file for complete search history.

(56) References Cited

U.S. PATENT DOCUMENTS 7,628,481 B2 * 12/2009 Kadomatsu et al. .......... 347/102
2010/0002038 A1     1/2010 Onozawa et al.
(Continued)

FOREIGN PATENT DOCUMENTS

JP     2002-137375 A     5/2002
JP     2003-136692 A     5/2003
(Continued)

OTHER PUBLICATIONS

An Office Action; "Notice of Reason for Rejection," issued by the Japanese Patent Office on Jan. 28, 2014, which corresponds to Japanese Patent Application No. 2012-044600 and is related to U.S. Appl. No. 13/774,990; with English language translation.

*Primary Examiner* — Matthew Luu
*Assistant Examiner* — Rut Patel
(74) *Attorney, Agent, or Firm* — Studebaker & Brackett PC

(57) ABSTRACT

An image forming method uses an ink set that includes applying a liquid composition onto a recording medium; further applying a ink composition onto the recording medium with an ink jet method to form an image; drying the image at a surface temperature of the image of 35° C. to 55° C. until a difference between a residual water content of a non-image portion on the recording medium and a residual water content of a image portion where an application amount of the ink composition is the maximum is 2 g/m² to 4 g/m²; and irradiating the image with active energy rays: the ink set includes the ink composition containing at least a pigment, water, 3% by mass or less of polymer particles, and 5% by mass to 15% by mass of polymerizable compound having an acrylamide structure represented by the formula (1); and the liquid composition containing an aggregation component.

Formula (1)

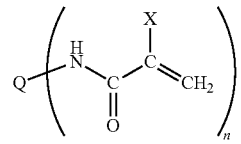

16 Claims, 2 Drawing Sheets

(51) Int. Cl.
*B41M 5/00* (2006.01)
*C09D 11/101* (2014.01)
*C09D 11/322* (2014.01)
*C09D 11/40* (2014.01)
*C09D 11/54* (2014.01)

(52) U.S. Cl.
CPC ............ *B41M 7/009* (2013.01); *C09D 11/101* (2013.01); *C09D 11/322* (2013.01); *C09D 11/40* (2013.01); *C09D 11/54* (2013.01)

(56) References Cited

U.S. PATENT DOCUMENTS

| | | |
|---|---|---|
| 2010/0075052 A1 | 3/2010 | Irita |
| 2011/0205291 A1 | 8/2011 | Yasuda et al. |
| 2011/0211012 A1 | 9/2011 | Irita |
| 2011/0211014 A1 | 9/2011 | Irita |
| 2011/0273522 A1* | 11/2011 | Kanazawa ............ 347/102 |
| 2011/0279612 A1* | 11/2011 | Muro et al. ............ 347/102 |
| 2014/0132685 A1* | 5/2014 | Amao et al. ............ 347/102 |

FOREIGN PATENT DOCUMENTS

| | | |
|---|---|---|
| JP | 2005-138463 A | 6/2005 |
| JP | 2010-012752 A | 1/2010 |
| JP | 2010-070693 A | 4/2010 |
| JP | 2011-178029 A | 9/2011 |
| JP | 2011-178033 A | 9/2011 |
| JP | 2011-195822 A | 10/2011 |
| JP | 2011-252092 A | 12/2011 |
| JP | 2012-012443 A | 1/2012 |
| WO | 2012/133182 A1 | 10/2012 |
| WO | 2013/008626 A1 | 1/2013 |

* cited by examiner

IMAGE FORMING METHOD

BACKGROUND OF THE INVENTION

1. Field of the Invention

The present disclosure relates to an image forming method using an ink jet method.

2. Description of the Related Art

Ink jet technology is an image forming method which is widely expected in the fields of office printers, home printers, and the like and in the commercial field because a desired image can be formed on various recording media.

A water-based ink attracts attention as an ink used for ink jet recording in consideration of solvents, the global environment, and the work environment. However, a solvent of a water-based ink contains water as a major component. Therefore, a liquid film of a water-based ink, applied onto a recording medium, is difficult to dry as compared to a case where a solvent is an organic solvent. In particular, since high-speed printing has been required in recent years, various techniques, which focus on the drying of an ink liquid film during image formation and the curing of an ink liquid film, are disclosed.

As techniques which focus on the drying of an ink liquid film, for example, disclosed are methods (for example, refer to JP-2002-137375A, JP-2003-136692A, and JP-2005-138463A) of controlling hydrothermal conditions and heating conditions of a recording medium; and a method (for example, refer to JP-2010-012752A) of causing a recording medium, onto which an ink is ejected, to pass through the inside of a waveguide, to which electromagnetic waves are supplied, and controlling the intensity of the electromagnetic waves according to the parameter relating to the drying degree of the recording medium.

As a technique which focuses on the curing of an ink liquid film, disclosed is a method (for example, JP-2011-195822A) of preparing an ink as an aqueous ink composition which includes a water-soluble polymerizable compound containing two or more polymerizable functional groups each selected from the group consisting of a (meth)acrylamide group, a maleimide group, a vinyl sulfone group, and an N-vinyl amide group, wherein a ratio of a molecular weight of the compound relative to a number of the polymerizable functional groups contained in a single molecule of the compound is 175 or less; a polymerization initiator; and water.

SUMMARY OF THE INVENTION

However, in the above-described techniques of the related art, there are some cases where uncured components may exude from the cured ink liquid film, the brilliance of an image may deteriorate, or the brilliance may be uneven. In addition, when the content of polymer particles in an ink increases in order to prevent uncured components from exuding and the brilliance of an image from deteriorating, the brilliance of an image increases; whereas, an ink discharge property (ease of discharge) from ink jet nozzles deteriorates. Both the suppression of the unevenness in the brilliance of an image and the improvement of the ink discharge property are difficult to realize at the same time.

The present disclosure has been made in consideration of the above-described circumstances, and an object thereof is to provide an image forming method in which a discharge property of an ink composition is superior and an image having a small amount of unevenness in brilliance can be formed.

The present inventors have found that, when the content of polymer particles in an ink composition is reduced in order to improve an ink discharge property and the temperature of drying a liquid film of the ink composition is excessively high, the water content in an image is excessively low, the brilliance of an image deteriorates, and the brilliance is likely to be uneven. Furthermore, the present inventors found that, even when the drying temperature of an image is low, the brilliance of an image can be improved and the unevenness in brilliance can be suppressed by setting the water content of an image portion to a specific value with a polymerizable compound that is easy to cure. The claimed inventions have been achieved based on these findings.

Specific means for achieving the above-described object is as follows.

<1> An image forming method using an ink set comprising: applying the liquid composition onto a recording medium; applying the ink composition onto a liquid-composition-applied surface of the recording medium with an ink jet method to form an image after applying the liquid composition; drying the image, formed on the recording medium, at a surface temperature of the image of 35° C. to 55° C. until a difference between a residual water content of a non-image portion on the recording medium where the ink composition is not applied and a residual water content of a portion of the image where an application amount of the ink composition is the maximum is 2 g/m$^2$ to 4 g/m$^2$ after applying the ink composition; and irradiating the image with active energy rays after drying the image. The ink set includes the ink composition which contains at least a pigment, water, 3% by mass or less of polymer particles with respect to the total mass of the ink composition, and 5% by mass to 15% by mass of a polymerizable compound having an acrylamide structure represented by the following formula (1) with respect to the total mass of the ink composition; and the liquid composition which contains an aggregation component capable of aggregating the ink composition.

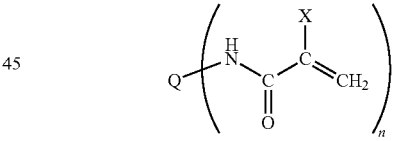

Formula (1)

In the formula (1), Q represents a n-valent linking group, X represents $CH_3$ or H; and n represents an integer of 2 or more.

<2> In the image forming method according to <1> above, the ink set contains a black ink.

Examples of the black ink include ink compositions in which the pigment included in the ink composition is a black pigment such as black titanium oxide or carbon black.

<3> In the image forming method according to <1> or <2> above, regarding the polymerizable compound, n in the formula (1) represents an integer of 3 or more.

<4> In the image forming method according to any one of <1> to <3> above, regarding the polymerizable compound, n in the formula (1) represents an integer of 4 or more.

<5> In the image forming method according to any one of <1> to <4> above, the polymerizable compound has an acrylamide structure represented by the following formula (2).

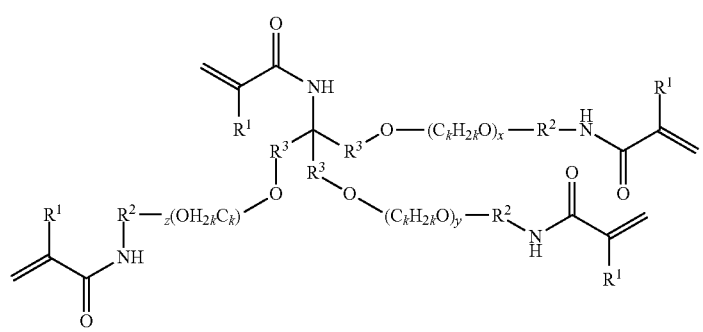

Formula (2)

In the formula (2), $R^1$ represents a hydrogen atom or a methyl group; $R^2$ represents a linear or branched alkylene group having 2 to 4 carbon atoms; $R^3$ represents a divalent linking group; k represents 2 or 3, x, y, and z each independently represent an integer of 0 to 6; and a value of x+y+z satisfies an integer of 0 to 18.

<6> In the image forming method according to any one of <1> to <5> above, a transport rate of the recording medium is 300 mm/s to 1200 mm/s in drying processing.

<7> In the image forming method according to any one of <1> to <6> above, the ink composition further contains a dispersant which disperses the pigment.

<8> In the image forming method according to any one of <1> to <7> above, the recording medium is a coated paper having a pigment layer on at least one surface of a support.

According to the present disclosure, an image forming method is provided in which a discharge property of an ink composition is superior and an image having a small amount of unevenness in brilliance can be formed.

DESCRIPTION OF THE PREFERRED EMBODIMENTS

Figure 1:
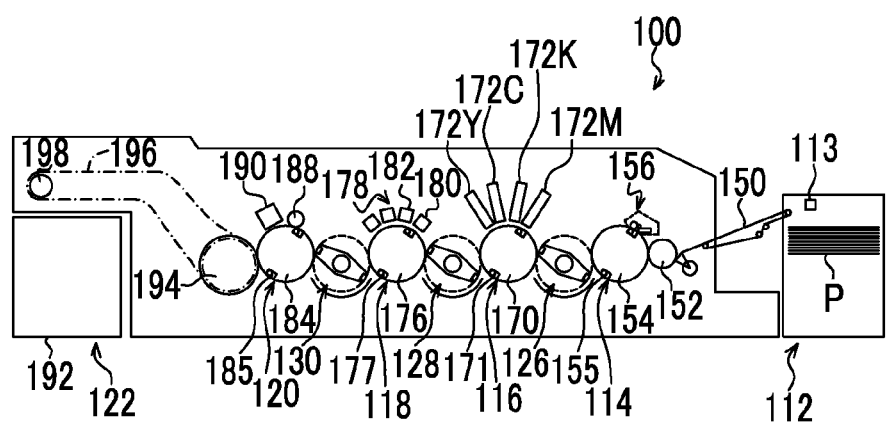
FIG. 1 is a diagram schematically illustrating a configuration example of an ink jet recording apparatus which is used in an image forming method according to an embodiment of the present disclosure.

Hereinafter, an image forming method according to an embodiment of the present disclosure will be described.

The image forming method according to the embodiment uses an ink set that applying a liquid composition onto a recording medium;

applying a ink composition onto a liquid-composition-applied surface of the recording medium with an ink jet method to form an image after applying the liquid composition;

drying the image, formed on the recording medium, at a surface temperature of the image of 35° C. to 55° C. until a difference between a residual water content of a non-image portion on the recording medium where the ink composition is not applied and a residual water content of a portion of the image where an application amount of the ink composition is the maximum is 2 g/m² to 4 g/m² after applying the ink composition; and irradiating the image with active energy rays after drying the image.

The ink set includes the ink composition which contains at least a pigment, water, 3% by mass or less of polymer particles with respect to the total mass of the ink composition, and 5% by mass to 15% by mass of a polymerizable compound having an acrylamide structure represented by the following formula (1) with respect to the total mass of the ink composition; and the liquid composition which contain an aggregation component capable of aggregating the ink composition.

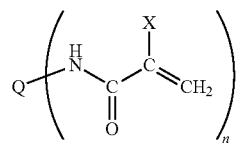

Formula (1)

In the formula (1), Q represents a n-valent linking group; X represents $CH_3$ or H; and n represents an integer of 2 or more.

Images are formed with an ink jet method by discharging an ink composition through ink jet nozzles. However, since more accurate image forming is required in recent ink jet recording, the diameter of the nozzles is reduced and clogging is likely to occur. In addition, since high-speed printing in which printing is performed at a higher speed is required, it is necessary that an ink composition be smoothly discharged through the nozzles. From this point of view, a discharge property of an ink composition is an important factor for ink jet recording.

Incidentally, there are many cases where an ink composition contains polymer particles in order to obtain the brilliance of an image formed according to ink jet recording. Polymer particles have larger-sized molecules than those of a low-molecular-weight compound such as a polymerizable compound (monomer). Therefore, when the content of polymer particles in an ink composition is large (when the content is greater than 3% by mass with respect to the total mass of the ink composition), the viscosity of the ink composition easily increases. Accordingly, the brilliance of an image can be improved by increasing the content of polymer particles in an ink composition, however, the viscosity of the ink composition increases, which may cause a deterioration in the discharge property of the ink composition. On the other hand, when the content of polymer particles in an ink composition is reduced, the viscosity of the ink composition is reduced and the fluidity increases. Therefore, the discharge property of the ink composition through nozzles is improved. However it is difficult for brilliance to be imparted to an image and the brilliance is likely to be uneven because the content of the polymer particles, which have a function of imparting brilliance to an image, is low.

For these reasons, the discharge property of an ink composition and the brilliance of an image (in particular, the suppression of unevenness in brilliance) are difficult to improve at the same time.

In contrast, in the image forming method according to the embodiment, even when the content of the polymer particles in the ink composition is low (less than or equal to 3% by mass with respect to the total mass of the ink composition), a discharge property of the ink composition is superior and an image having superior brilliance can be formed. Therefore, the discharge property of the ink composition and the brilliance of an image can be improved at the same time.

The reason is not clear, but is considered to be as follows.

It is considered that the brilliance of an image can be obtained with a method in which, when a liquid film of the ink composition is dried by heating, the polymer particles in the ink composition coalesce and a cured film, obtained by curing the liquid film, is coated with the coalesced polymer particles. Therefore, in order to improve the brilliance of an image, it is necessary that heating be performed to a degree that can cause the polymer particles to coalesce. In addition, one of the reasons why a liquid film of the ink composition is sufficiently heated is considered to be as follows. When a solvent of the ink composition remains in a liquid film, it is difficult to advance a curing reaction of a polymerizable compound and thus uncured components are likely to exude from the cured film of the ink composition. Therefore, in order to suppress the exuding of the uncured components, it is necessary that a solvent in a liquid film be sufficiently evaporated to be removed.

When the content of the polymer particles in the ink composition is reduced in order to suppress the viscosity of the ink composition, and a liquid film is excessively heated or the heating time of the liquid film is increase for removing a solvent from the liquid film, water in the liquid film of the ink composition has a tendency to be removed therefrom excessively. It was found that, when water is excessively removed from the liquid film, the brilliance of an image deteriorated because, for example, particles on a surface of a cured film (image) are blown or the surface thereof is roughened.

In the image forming method according to the embodiment, when a liquid film of the ink composition is dried, the surface temperature of an image is set to be low such that the liquid film was not excessively heated and drying is performed such that the water content of an image is the above-described specific value. As a result, the liquid film of the ink composition, which will form an image, is dried while maintaining the moisture to some degrees. Therefore, it is considered that the brilliance of a cured film (image), obtained by curing the liquid film, does not easily deteriorate and the unevenness in the brilliance of an image is suppressed.

That is, in the image forming method according to the embodiment, it is considered that, even when the content of the polymer particles in the ink composition is low, the brilliance of a formed image is superior; and as a result, the ease of discharge of the ink composition and the high brilliance of an image (suppression of unevenness in brilliance) can be obtained at the same time.

Hereinafter, the image forming method according to the embodiment will be described in detail.

First, the ink set used in the image forming method according to the embodiment will be described.

Ink Set

The ink set used in the image forming method according to the embodiment (hereinafter, sometimes referred to as "the ink set according to the embodiment") includes an ink composition which contains at least a pigment, water, 3% by mass or less of polymer particles with respect to the total mass of the ink composition, and 5% by mass to 15% by mass of polymerizable compound having an acrylamide structure represented by the following formula (1) with respect to the total mass of the ink composition; and a liquid composition which contains an aggregation component capable of aggregating the ink composition.

The ink composition is a base material component of an image which is formed on a recording medium. The liquid composition is referred to as a treatment solution and is a component which is applied onto the recording medium prior to the application of the ink composition. The liquid composition serves to aggregate components in the ink composition when being in contact with the ink composition and is an auxiliary material for image formation.

Ink Composition

The ink composition used in the image forming method according to the embodiment (hereinafter, sometimes referred to as "the ink composition according to the embodiment") contains at least a pigment, water, 3% by mass or less of polymer particles with respect to the total mass of the ink composition, and 5% by mass to 15% by mass of a polymerizable compound having an acrylamide structure represented by the formula (1) with respect to the total mass of the ink composition.

Hereinafter, "a polymerizable compound having an acrylamide structure which is polymerized with active energy rays and is represented by the formula (1)" will also be referred to as "the specific monomer".

That is, the ink composition according to the embodiment contains a pigment, water, polymer particles, and the specific monomer. In this case, the content of the polymer particles is less than or equal to 3% by mass with respect to the total mass of the ink composition and the content of the specific monomer is 5% by mass to 15% by mass with respect to the total mass of the ink composition.

The ink composition according to the embodiment may further contain a surfactant, a water-soluble organic solvent, and a polymerization initiator within a range not impairing the effects of the embodiment.

The ink composition according to the embodiment is used as an ink for ink jet recording and can be used for forming a color image. For example, when a full-color image is formed, it is preferable that the ink composition be used as a magenta ink, a cyan ink, and a yellow ink; and furthermore the ink composition may be used as a black ink in order to adjust the color, in addition, the ink composition can be used as a red, green, blue, or white ink other than yellow, magenta, cyan inks or as a so-called special color ink in the printing field.

Polymerizable Compound Represented by Formula (1) (Specific Monomer)

The ink composition according to the embodiment contains 5% by mass to 15% by mass of at least one kind of polymerizable compound (specific monomer) having an acrylamide structure represented by the formula (1), which can be polymerized with active energy rays, with respect to the total mass of the ink composition.

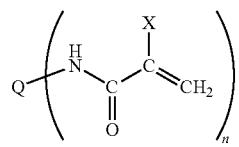

Formula (1)

In the formula (1), Q represents a n-valent linking group; X represents $CH_3$ or H; and n represents an integer of 2 or more.

The specific monomer is a water-soluble polyvalent (meth) acrylamide which has a polymerizable group in the molecules and at least two (meth)acrylamide structures and is polymerized by the irradiation of active energy rays.

"Water-soluble" described herein represents being able to dissolve something in water at a given concentration or higher. In the embodiment, the specific monomer may have a solubility in a water-based ink or, possibly, in the liquid composition. Specifically, the solubility thereof in water (at 25° C.) is preferably greater than or equal to 10% by mass and more preferably greater than or equal to 15% by mass.

In a polyvalent (meth)acrylamide in which n in the formula (1) satisfies an expression of 2≤n, when an image is cured by the irradiation of active energy rays, the polymerizability and the polymerization efficiency are high and the wear resistance and scratch resistance of a formed image can be improved.

The specific monomer has a structure in which an unsaturated vinyl monomer is bonded to a group Q with an amide bond.

In the formula (1), X represents a hydrogen atom (H) or a methyl group ($CH_3$), and preferably represents a hydrogen atom (H).

In the formula (1), Q represents a n-valent linking group. The valence n of Q is 2 or higher, preferably 3 or higher, and more preferably 4 or higher, from the viewpoints of improving permeability, polymerization efficiency, and ink discharge stability. In addition, n is preferably 6 or lower.

Specific examples of the linking group Q include a substituted or unsubstituted alkylene group having 4 or less carbon atoms such as a methylene, ethylene, propylene, or butylene group; a divalent or higher valent linking group having a saturated or unsaturated hetero ring (such as a pyridine ring, an imidazole ring, a pyrazine ring, a piperidine ring, a pieprazine ring, or a morpholine ring); a divalent or higher valent residue of a polyol compound having an oxyalkylene group (preferably, an oxyethylene group); and a divalent or higher valent residue of a polyol compound having three or more oxyalkylene groups (preferably, oxyethylene groups).

Specific examples of the specific monomer are shown below. However, the specific monomer is not limited thereto.

Polymerizable Compound 1

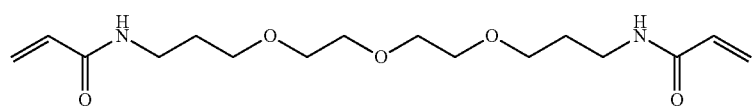

Polymerizable Compound 2

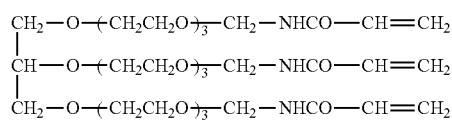

Polymerizable Compound 3

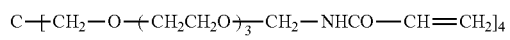

Polymerizable Compound 4

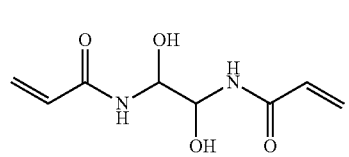

(a)

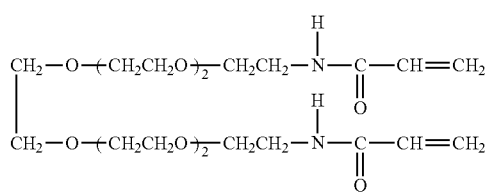

(b)

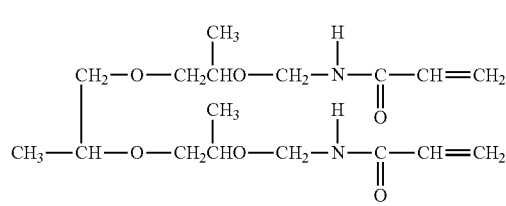

(c)

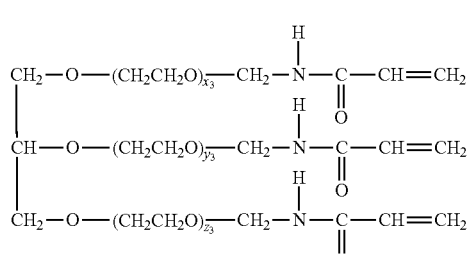

$x_3 + y_3 + z_3 = 6$

-continued
(d)
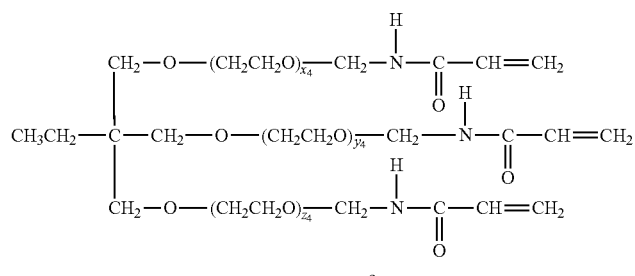
$x_4 + y_4 + z_4 = 9$
(e)
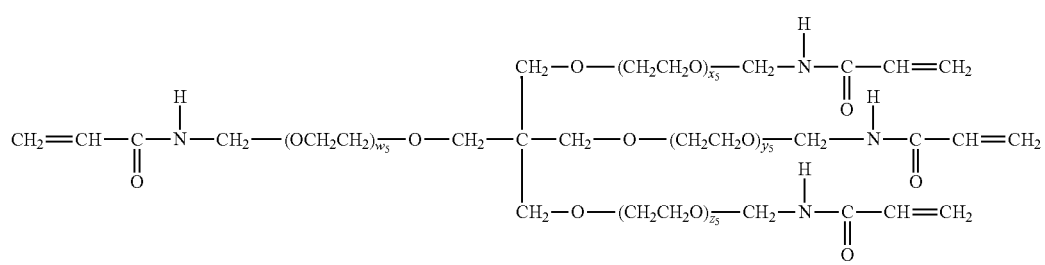
$w_5 + x_5 + y_5 + z_5 = 6$
(f)
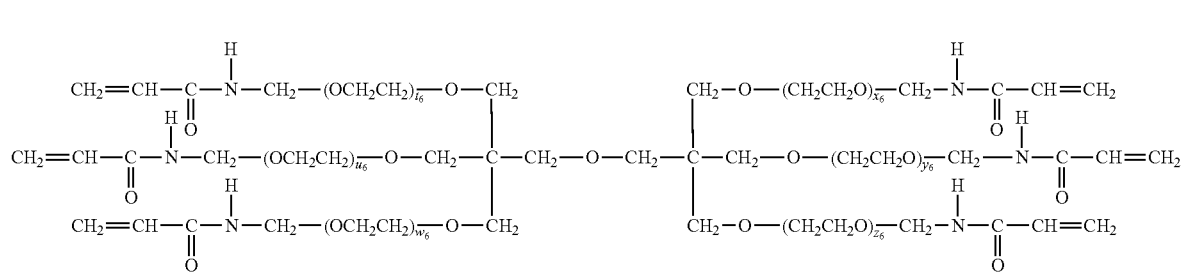
$t_6 + u_6 + w_6 + x_6 + y_6 + z_6 = 12$
(g)
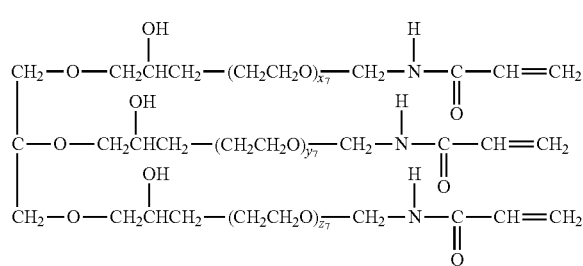
$x_7 + y_7 + z_7 = 3$
(h)
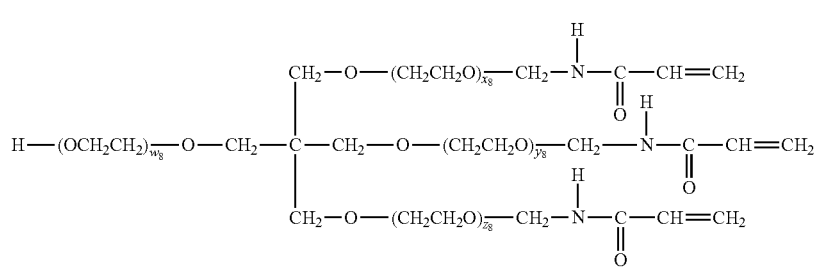
$w_8 + x_8 + y_8 + z_8 = 6$ -continued

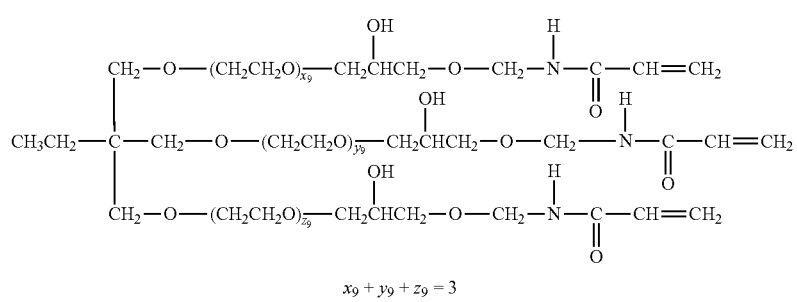

(i)

$x_9 + y_9 + z_9 = 3$

Furthermore, as the polyvalent (meth)acrylamide compound, a compound represented by the following formula (2) is preferable from the viewpoint that it has high polymerizability and curability. This compound has four acrylamide groups or methacrylamide groups as polymerizable groups in the molecules. In addition, this compound shows curability based on polymerization by the irradiation of active energy rays such as α-rays, γ-rays, X-rays, ultraviolet rays, visible light rays, infrared rays, or electron rays or with the application of energy such as heat. The compound represented by the following formula (2) shows solubility in water and satisfactorily dissolves in a water-soluble organic solvent such as water or alcohol.

compound represented by the formula (2) does not contain a compound having such a structure. A compound which has a —O—C—N structure in the molecules is not preferable from the viewpoints that cracking is likely to occur at a carbon atom portion and that the compound causes a deterioration in preservation stability when being included in the ink composition.

$R^3$ represents a divalent linking group, and each $R^3$ may be the same as or different from each other. Examples of the divalent linking group represented by $R^3$ include an alkylene group, an arylene group, a heterocyclic group, and a combination group thereof, and an alkylene group is preferable. When the divalent linking group contains an alkylene group, the alkylene group may further contain at least one kind of Formula (2)

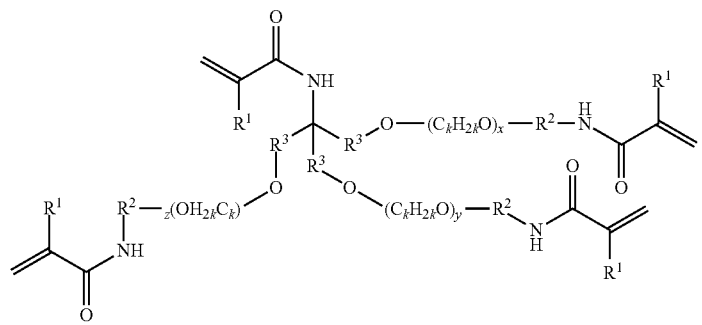

In the formula (2), represents a hydrogen atom or a methyl group and preferably represents a hydrogen atom. Each $R^1$ may be the same as or different from each other.

$R^2$ represents a linear or branched alkylene group having 2 to 4 carbon atoms. Each $R^2$ may be the same as or different from each other. $R^2$ preferably represents an alkylene group having 3 or 4 carbon atoms, more preferably an alkylene group having 3 carbon atoms, and still more preferably a linear alkylene group having 3 carbon atoms. The alkylene group represented by $R^2$ may further have a substituent. Examples of the substituent include an aryl group or an alkoxy group.

In this case, a structure in which an oxygen atom and a nitrogen atom, bonded to both terminals of $R^2$, are bonded to the same carbon atom of $R^2$ is not adopted. $R^2$ represents a linear or branched alkylene group which links an oxygen atom and a nitrogen atom of a (meth)acrylamide group to each other. When an alkylene group has a branched structure, an —O—C—N— structure (hemiaminal structure) in which an oxygen atom and a nitrogen atom of a (meth)acrylamide group at both terminals are bonded to the same carbon atom of the alkylene group is considered to be adopted. However, the group selected from —O—, —S—, and —NR$^a$—. R$^a$ represents a hydrogen atom or an alkyl group having 1 to 4 carbon atoms.

When $R^3$ contains an alkylene group, examples of the alkylene group include a methylene group, an ethylene group, a propylene group, a butylene group, a pentylene group, a hexylene group, a heptylene group, an octylene group, and a nonylene group. The number of carbon atoms of the alkylene group of $R^3$ is preferably 1 to 6, more preferably 1 to 3, and still more preferably 1. The alkylene group of $R^3$ may further contain at least one kind of group selected from —O—, —S—, and —NR$^a$—. Examples of the alkylene group containing —O— include —C$_2$H$_4$—O—C$_2$H$_4$— and —C$_3$H$_6$—O—C$_3$H$_6$—. The alkylene group of $R^3$ may further contain a substituent. Examples of the substituent include an aryl group and an alkoxy group.

When $R^3$ contains an arylene group, examples of the arylene group include a phenylene group and a naphthylene group. The number of carbon atoms of the arylene group of $R^3$ is preferably 6 to 14, more preferably 6 to 10, and still more preferably 6. The arylene group of $R^3$ may further contain a substituent. Examples of the substituent include an alkyl group and an alkoxy group.

When $R^3$ contains a heterocyclic group, a 5-membered or 6-membered heterocyclic ring is preferable as the heterocyclic group and may be condensed further. In addition, the heterocyclic group may be an aromatic heterocyclic ring or a non-aromatic heterocyclic ring. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these, aromatic heterocyclic groups are preferable, for example, pyridine, pyrazine, pyrimidine, pyridazine, triazine, pyrazole, imidazole, benzimidazole, triazole, thiazole, benzothiazole, isothiazole, benzisothiazole, and thiadiazole. The above-described examples of the heterocyclic group are shown in a state where the substitution positions thereof are not shown, but the substitution positions are not limited. For example, pyridine can be substituted at the 2-position, 3-position, or 4-position and can contain all these substituents.

The heterocyclic group may further contain a substituent, and examples of the substituent include an alkyl group, an aryl group, and an alkoxy group.

In the formula (2), k represents 2 or 3. Each k may be the same as or different from each other. In addition, $C_kH_{2k}$ may have a linear structure or a branched structure.

In addition, x, y, and z each independently represent an integer of 0 to 6, and preferably an integer of 0 to 5 and more preferably an integer of 0 to 3. A value of x+y+z satisfies an integer of 0 to 18, preferably an integer of 0 to 15, and more preferably an integer of 0 to 9.

Among the above-described cases, a case is preferable in which $R^1$ represents a hydrogen atom or a methyl group; $R^2$ represents an alkylene group having 3 or 4 carbon atoms; $R^3$ represents an alkylene group having 1 to 6 (preferably 1 to 3) carbon atoms; k represents 2 or 3; x, y, and z each independently represent an integer of 0 to 6; and a value of x+y+z satisfies an integer of 0 to 15.

Specific examples of the compound represented by the formula (2) are shown below. However, the compound is not limited thereto.

Polymerizable Compound a

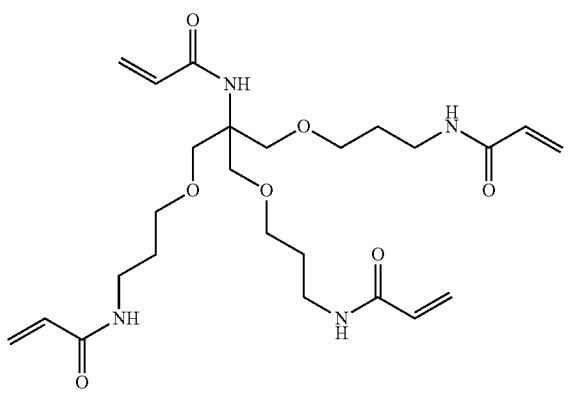

Polymerizable Compound b

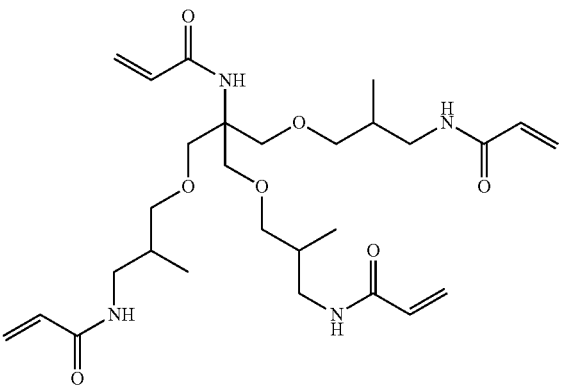

Polymerizable Compound c

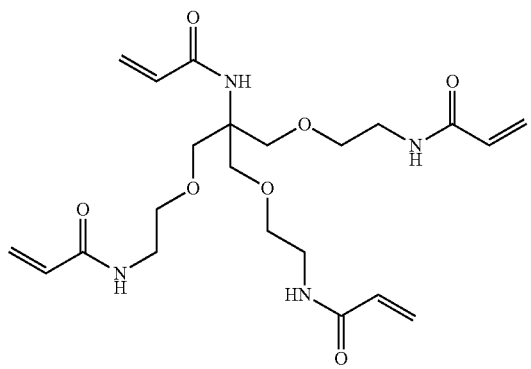

Polymerizable Compound d

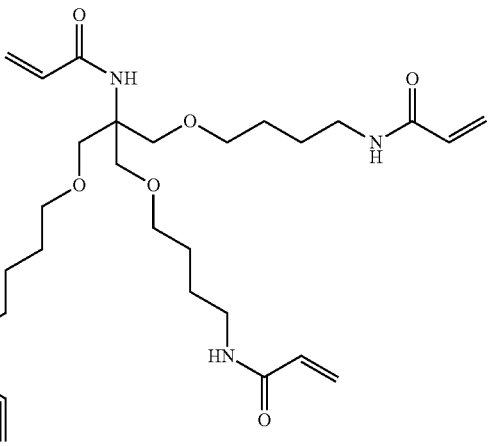

Polymerizable Compound e

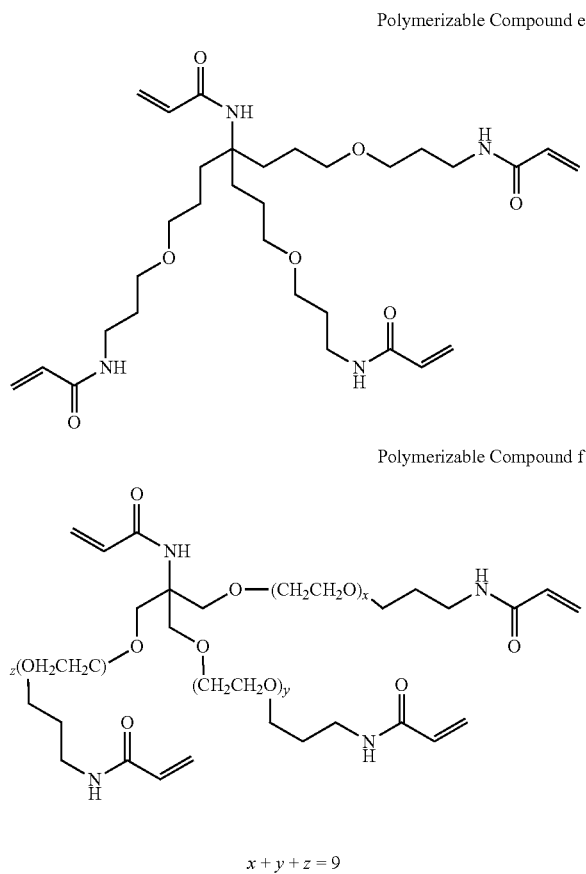

Polymerizable Compound f $x + y + z = 9$

The compound represented by the formula (2) can be prepared according to the following scheme 1 or scheme 2.

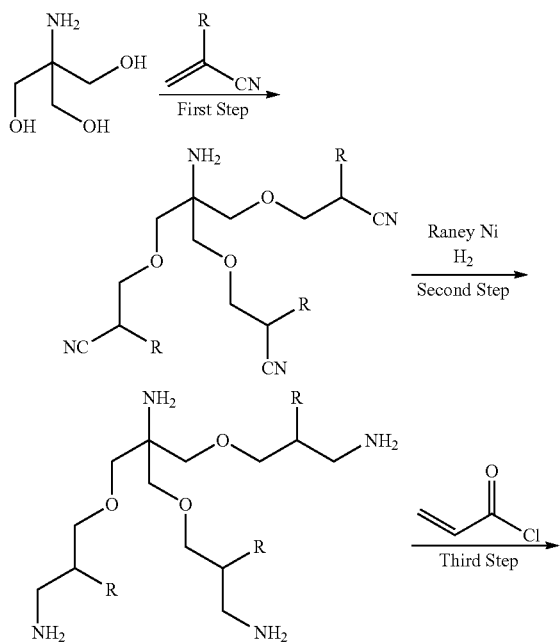

Scheme 1

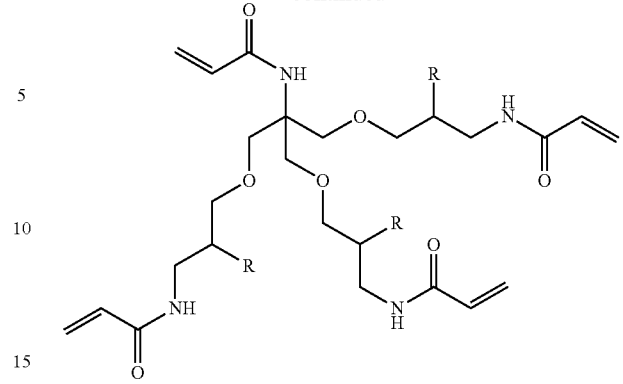

R = H, Me

In the scheme 1, the first step is a step in which a polycyano compound is obtained by a reaction of acrylonitrile and tris hydroxymethyl aminomethane. It is preferable that the reaction in this step be performed at 3° C. to 60° C. for 2 hours to 8 hours.

The second step is a step in which the polycyano compound is caused to react with hydrogen in the presence of a catalyst and a polyamine compound is obtained by reduction. It is preferable that the reaction in this step be performed at 20° C. to 60° C. for 5 hours to 16 hours.

The third step is a step in which a polyfunctional acrylamide compound is obtained by an acylation reaction of the polyamine compound and acrylic acid chloride or methacrylic acid chloride. It is preferable that the reaction in this step be performed at 3° C. to 25° C. for 1 hour to 5 hours. Diacrylic anhydride or dimethacrylic anhydride may be used as the acrylating agent instead of acid chloride By using both acrylic acid chloride and methacrylic acid chloride in the acylation reaction, a compound having an acrylamide group and a methacrylamide group in the same molecule can be obtained as a final product.

Scheme 2

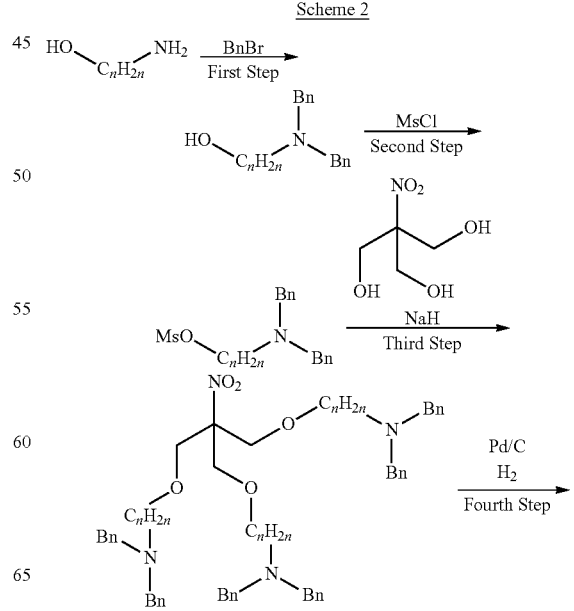

-continued

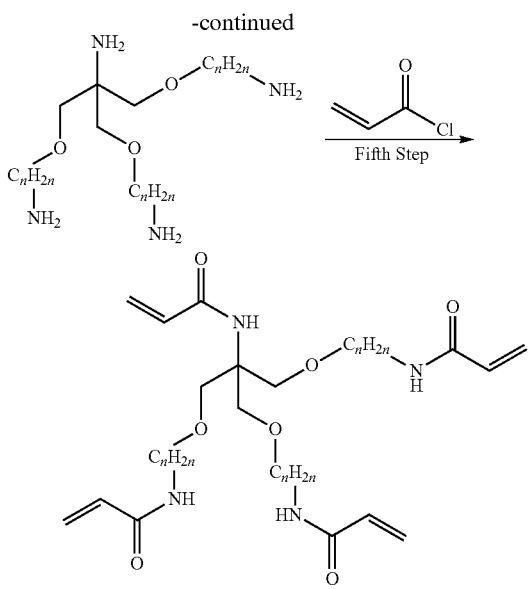

In the scheme 2, the first step is a step in which a nitrogen-protecting aminoalcohol compound is obtained by a protective group introducing reaction of a nitrogen atom of an aminoalcohol with a benzyl group, a benzyloxycarbonyl group, or the like. It is preferable that the reaction in this step be performed at 3° C. to 25° C. for 3 hours to 5 hours.

The second step is a step in which a sulfonyl compound is obtained by introducing a leaving group such as a methanesulfonyl group, a p-toluenesulfonyl group, or the like into an OH group of the nitrogen-protecting aminoalcohol compound. It is preferable that the reaction in this step be performed at 3° C. to 25° C. for 2 hours to 5 hours.

The third step is a step in which an aminoalcohol adduct is obtained by an $SN_2$ reaction of the sulfonyl compound with tris hydroxymethyl nitromethane. It is preferable that the reaction in this step be performed at 3° C. to 70° C. for 5 hours to 10 hours.

The fourth step is a step in which the aminoalcohol adduct is caused to react with hydrogen in the presence of a catalyst and a polyamine compound is obtained by a hydrogenation reaction. It is preferable that the reaction in this step be performed at 20° C. to 60° C. for 5 hours to 16 hours.

The fifth step is a step in which a polyfunctional acrylamide compound is obtained by an acylation reaction of the polyamine compound and acrylic acid chloride or methacrylic acid chloride. It is preferable that the reaction in this step be performed at 3° C. to 25° C. for 1 hour to 5 hours. Diacrylic anhydride or dimethacrylic anhydride may be used as the acrylating agent instead of acid chloride. By using both acrylic acid chloride and methacrylic acid chloride in the acylation reaction, a compound having an acrylamide group and a methacrylamide group in the same molecule can be obtained as a final product.

A compound obtained in the above-described steps can be prepared from a reaction solution with an ordinary method. For example, the compound can be prepared with liquid separation extraction using an organic solvent, crystallization using a poor solvent, or column chromatography using silica gel.

The content of the specific monomer in the ink composition is 5% by mass to 15% by mass, preferably 7.5% by mass to 12.5% by mass, and more preferably 8% by mass to 12% by mass, with respect to the total mass of the ink composition.

When the content of the specific monomer in the ink composition is less than 5% by mass, curing reactivity is insufficient and curing is not uniformly performed over the entire image. In addition, when the content of the specific monomer in the ink composition is greater than 15% by mass and a liquid film of the ink composition is dried under temperature conditions of a drying step described below, uncured components, which are not completely cured, remain on the ink liquid film and exude therefrom.

In the embodiment, it is preferable that the above-described specific polymer be used in combination with a monofunctional (meth)acrylamide. By adding the monofunctional (meth)acrylamide, when a coated paper having a pigment layer is used as a recording medium, an ink having superior permeability to the pigment layer can be obtained. As a result, the pigment layer is cured in addition to the image and the adhesion between the cured film (image) and the recording medium is improved.

Examples of the monofunctional (meth)acrylamide include a compound represented by the formula (1) in which n=1. When n=1, the group Q may be a monovalent group which can be linked to a (meth)acrylamide structure. When n=1, the group Q is preferably a water-soluble group. Specific examples thereof include a monovalent residue of a compound selected from the following compound group X from which one or more hydrogen atoms or a hydroxyl group is excluded.

Compound X: polyol compounds such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentylglycol, pentaerythritol, dipentaerythritol, condensates thereof, low-molecular-weight polyvinyl alcohols, and sugars; and polyamine compounds such as ethylenediamine, diethylenetriamine, triethylenetetramine, polyethyleneimine, and polypropylenediamine.

Examples of the monofunctional (meth)acrylamide include the following compounds.

Polymerizable Compound 5

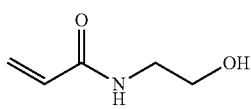

Polymerizable Compound 6

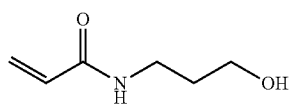

Polymerizable Compound 7

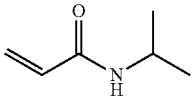

Polymerizable Compound 8

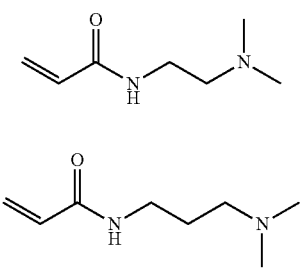

Polymerizable Compound 9

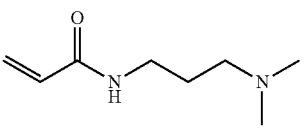

Furthermore, the specific monomer may be used in combination with a cationic polymerizable compound. The cationic polymerizable compound is a compound having a cationic group and a polymerizable group such as an unsaturated double bond. For example, epoxy monomers or oxetane monomers can preferably be used. When the cationic polymerizable compound is added, a cationic property of the ink composition is strengthened by a cationic group and color mixing in the case of using an anionic ink is more efficiently prevented.

Polymer Particles

The content of polymer particles in the ink composition according to the embodiment is less than or equal to 3% by mass with respect to the total mass of the ink composition. The content P of polymer particles in the ink composition with respect to the total mass of the ink composition satisfies an expression of 0% by mass≤P≤3% by mass. In addition, the ink composition does not necessarily contain polymer particles.

The polymer particles described in the embodiment represent particles having a weight average molecular weight (Mw) of greater than 2,000 and does not include polymer particles such as a polymeric dispersant which function as a pigment dispersant.

The polymer particles have a function of fixing the ink composition with a method in which the polymer particles are unstably dispersed and aggregate in the ink composition when being in contact with a liquid composition in a pretreatment step described below; and a function of coating a cured film (image) to impart brilliance to an image.

The content of the polymer particles in the ink composition is preferably 1% by mass to 3% by mass with respect to the total mass of the ink composition from the viewpoints of imparting brilliance to an image and satisfactorily maintaining the ink discharge property at the same time.

As the polymer particles, one kind can be used alone or a mixture of two or more kinds thereof can be used.

The polymer particles can be used as a latex in which polymer particles are dispersed in an aqueous medium. Examples of the polymer include acrylic resins, vinyl acetate-based resins, styrene-butadiene-based resins, vinyl chloride-based resins, acryl-styrene-based resins, butadiene-based resins, styrene-based resins, cross-linked acrylic resins, cross-linked styrene-based resins, benzoguanamine resins, phenol resins, silicone resins, epoxy resins, urethane-based resins, paraffin-based resins, and fluororesins. Among these, preferable examples include acrylic resins, acryl-styrene-based resins, styrene-based resins, cross-linked acrylic resins, and cross-linked styrene-based resins.

The above-described aqueous medium contains water and optionally may further contain a hydrophilic organic solvent. In the embodiment, it is preferable that the aqueous medium contain water and 0.2% by mass or less of hydrophilic organic solvent with respect to water and it is more preferable that the aqueous medium contain only water.

Among polymer particles, self-dispersible polymer particles are preferable. The self-dispersible polymer particles represent particles of a water-insoluble polymer which does not contain a free emulsifier and can be dispersed in an aqueous medium by a polyfunctional group (in particular, an acidic group or a salt thereof) included in the polymer particles when the dispersion is performed in the absence of a surfactant (in particular, when the dispersion is performed with a phase-transfer emulsification method). The self-dispersible polymer particles are preferable from the viewpoint of discharge stability and liquid stability (in particular, dispersion stability) of the ink composition containing a pigment.

In this case, the dispersion state includes both an emulsion state in which the water-insoluble polymer particles in the liquid state are emulsified in the aqueous medium and a suspension state in which the water-insoluble polymer in the solid state is suspended in the aqueous medium. It is preferable that the water-insoluble polymer particles according to the embodiment be in the suspension state where the water-insoluble polymer particles in the solid state are suspended in the aqueous medium, from the viewpoint of the aggregation rate and a fixing property when being in contact with a liquid composition.

Examples of a method of emulsifying or suspending the self-dispersible polymer particles, that is, examples of a method of preparing an aqueous dispersion of the self-dispersible polymer particles include a phase-transfer emulsification method. Examples of the phase-transfer emulsification method include a method in which the self-dispersible polymer particles are dissolved or dispersed in a solvent (for example, a hydrophilic organic solvent); the resultant is poured into water without adding a surfactant to neutralize a salt-producing group (for example, an acidic group) included in the self-insoluble polymer particles, followed by stirring and mixing; the solvent is removed; and as a result, an aqueous dispersion in the emulsion or suspension state is obtained.

The dispersion state of the self-dispersible polymer particles is a state in which, when a solution which is obtained by dissolving 30 g of water-insoluble polymer particles in 70 g of an organic solvent (for example, methyl ethyl ketone), a neutralizer (when a salt-producing group is anionic, sodium hydroxide; when a salt-producing group is cationic, acetic acid) which can completely neutralize a salt-producing group of the water-insoluble polymer particles, and 200 g of water are mixed and stirred (device: stirrer equipped with a stirring blade; rotating speed: 200 rpm; 30 minutes; 25° C.), the dispersion state is visually and stably observed at 25° C. for at least 1 week even after the removal of the organic solvent from the mixed solution.

In addition, the water-insoluble polymer represents a polymer which has a dissolution amount of 10 g or less when being dried at 105° C. for 2 hours and dissolved in 100 g of water at 25° C. The dissolution amount is preferably less than or equal to 5 g and more preferably less than or equal to 1 g. The dissolution amount described herein is a value when a salt-producing group of the water-insoluble polymer is completely neutralized by using sodium hydroxide or acetic acid according to the kind of the salt-producing group.

The details of the self-dispersible polymer particles used in the embodiment can be found in paragraphs 0066 to 0113 of JP-2011-042150A, and the description can be applied to the embodiment.

It is preferable that the self-dispersible polymer particles according to the embodiment contain water-insoluble polymer particles having a hydrophilic constitutional unit and a constitutional unit derived from an aromatic group-containing monomer from the viewpoint of self-dispersibility.

The hydrophilic constitutional unit is not particularly limited as long as it is a repeating unit derived from a hydrophilic group-containing monomer. As the hydrophilic group-containing monomer, a dissociable group-containing monomer is preferable and a dissociable group-containing monomer having an ethylenic unsaturated bond with the dissociable group is more preferable from the viewpoint of self-dispersibility and aggregability. Examples of the dissociable group-containing monomer include unsaturated carboxylic acid monomers, unsaturated sulfonic acid monomers, and unsaturated phosphoric acid monomers. Specific examples of the unsaturated carboxylic acid monomers include acrylic acid, methacrylic acid, crotonic acid, itaconic acid, maleic acid, fumaric acid, citraconic acid, and 2-methacryloyloxymethyl succinic acid. Among the dissociable group-containing monomers, unsaturated carboxylic acid monomers are preferable, acrylic monomers are more preferable, and acrylic acid and methacrylic acid are still more preferable, from the viewpoints of dispersion stability and ink discharge stability.

The aromatic group-containing monomer is not particularly limited as long as it is a compound having an aromatic group and a polymerizable group. It is preferable that the aromatic group-containing monomer be a monomer having an aromatic group derived from an aromatic hydrocarbon and an ethylenic unsaturated bond. Examples thereof include phenoxyethyl(meth)acrylate, benzyl(meth)acrylate, phenyl (meth)acrylate, and styrene-based monomers. Among these, from the viewpoint of the balance between hydrophilicity and hydrophobicity of a polymer chain and an ink fixing property, aromatic group-containing (meth)acrylate monomers is preferable, at least one kind selected from phenoxyethyl(meth) acrylate, benzyl(meth)acrylate, and phenyl(meth)acrylate is more preferable, and phenoxyethyl(meth)acrylate or benzyl (meth)acrylate is still more preferable.

The acid value of the self-dispersible polymer particles is preferably 25 mgKOH/g to 100 mgKOH/g and more preferably 30 mgKOH/g to 70 mgKOH/g from the viewpoint of aggregability when the self-dispersible polymer particles are in contact with the treatment solution. When the acid value is greater than or equal to 25 mgKOH/g, stable self-dispersibility is obtained. It is more preferable that the self-dispersible polymer particles contain a carboxyl group and polymer particles having an acid value within the above-described range, from the viewpoints of self-dispersibility and aggregability when being in contact with the treatment solution.

Regarding the molecular weight of the water-insoluble polymer constituting the self-dispersible polymer particles, the weight average particle size thereof is preferably 3,000 to 200,000, more preferably 5,000 to 150,000, and still more preferably 10,000 to 100,000. When the weight average molecular weight is greater than or equal to 3000, the amount of water-soluble components can be effectively suppressed. In addition, when the weight average molecular weight is less than or equal to 200,000, self-dispersion stability can increase.

The weight average molecular weight of the polymer is measured using gel permeation chromatography (GPC). HLC-8220GPC (manufactured by Tosoh Corporation) is used as high-speed GPC equipment; TSKgeL Super HZM-H, TSKgeL Super HZ4000, and TSKgeL Super HZ2000 (manufactured by Tosoh Corporation, 4.6 mmID×15 cm) are used as columns; and tetrahydrofuran (THF) is used as an eluent.

From the viewpoints of controls of hydrophobicity and hydrophilicity of the polymer, it is preferable that the water-insoluble polymer constituting the self-dispersible polymer particles contain 15% by mass to 80% by mass (in terms of copolymerization ratio) of a constitutional unit derived from an aromatic group-containing (meth)acrylate monomer (preferably, a construction unit derived from a phenoxyethyl (meth)acrylate monomer and/or a constitutional unit derived from a benzyl(meth)acrylate monomer) with respect to the total mass of the self-dispersible polymer particles.

In addition, from the viewpoints of control of hydrophobicity and hydrophilicity of the polymer, it is preferable that the water-insoluble polymer contain 15% by mass to 80% by mass (in terms of copolymerization ratio) of a constitutional unit derived from an aromatic group-containing (meth)acrylate monomer, a constitutional unit derived from a carboxyl group-containing monomer, and a constitutional unit derived from an alkyl group-containing monomer (preferably, a constitutional unit derived from an alkyl ester of (meth)acrylic acid), and it is more preferable that the water-insoluble contain 15% by mass to 80% by mass (in terms of copolymerization ratio) of a constitutional unit derived from phenoxyethyl(meth)acrylate and/or a constitution unit derived from benzyl(meth)acrylate, a constitutional unit derived from a carboxyl group-containing monomer, and a constitutional unit derived from an alkyl group-containing monomer (preferably, a constitutional unit derived from an alkyl ester of (meth)acrylic acid having 1 to 4 carbon atoms). Furthermore, it is still more preferable that the acid value of the water-insoluble polymer be 25 mgKOH/g to 95 mgKOH/g and the weight average molecular weight be 5,000 to 150,000.

Specific examples of the water-insoluble polymer constituting the self-dispersible polymer particles include phenoxyethyl acrylate/methyl methacrylate/acrylic acid copolymer (50/45/5), phenoxyethyl acrylate/benzyl methacrylate/isobutyl methacrylate/methacrylic acid copolymer (30/35/29/6), phenoxyethyl methacrylate/isobutyl methacrylate/methacrylic acid copolymer (50/44/6), phenoxyethyl acrylate/methyl methacrylate/ethylacrylate/acrylic acid copolymer (30/55/10/5), benzyl methacrylate/isobutyl methacrylate/methacrylic acid copolymer (35/59/6), styrene/phenoxyethyl acrylate/methyl methacrylate/acrylic acid copolymer (10/50/35/5), benzyl acrylate/methyl methacrylate/acrylic acid copolymer (55/40/5), phenoxyethyl methacrylate/benzyl acrylate/methacrylic acid copolymer (45/47/8), styrene/phenoxyethyl acrylate/butyl methacrylate/acrylic acid copolymer (5/48/40/7), benzyl methacrylate/isobutyl methacrylate/cyclohexyl methacrylate/methacrylic acid copolymer (35/30/30/5), phenoxyethyl acrylate/methyl methacrylate/butyl acrylate/methacrylic acid copolymer (12/50/30/8), benzyl acrylate/isobutyl methacrylate/acrylic acid copolymer (93/2/5), styrene/phenoxyethyl methacrylate/butyl acrylate/acrylic acid copolymer (50/5/20/25), styrene/butyl acrylate/acrylic acid copolymer (62/35/3), methyl methacrylate/phenoxyethyl acrylate/acrylic acid copolymer (45/51/4), methyl methacrylate/phenoxyethyl acrylate/acrylic acid copolymer (45/49/6), methyl methacrylate/phenoxyethyl acrylate/acrylic acid copolymer (45/48/7), methyl methacrylate/phenoxyethyl acrylate/acrylic acid copolymer (45/47/8), and methyl methacrylate/phenoxyethyl acrylate/acrylic acid copolymer (45/45/10). Numerical values in the brackets indicate mass ratios of copolymerization components.

The volume average particle size of the polymer particles is preferably in a range of 1 nm to 70 nm, and the particle size distribution thereof may be a wide particle size distribution or a monodispersed particle size distribution. The volume average particle size and the particle size distribution can be measured according to a dynamic light scattering method using a Nanotrac particle size distribution analyzer UPA-EX150 (manufactured by Nikkiso Co., Ltd.).

In addition, the glass transition temperature (Tg) of the self-dispersible polymer particles is preferably higher than or equal to 70° C., more preferably higher than or equal to 80° C., and still more preferably higher than or equal to 100° C. When the Tg is higher than or equal to 70° C., local blocking resistance can be improved.

Water

The ink composition according to the embodiment contains water. The content of water is not particularly limited, but is preferably 10% by mass to 99% by mass, more preferably 30% by mass to 80% by mass, and still more preferably 50% by mass to 70% by mass with respect to the total mass of the ink composition.

Pigment

The ink composition according to the embodiment contains at least one kind of pigment.

The pigment is not particularly limited and can be appropriately selected according to the purpose. For example, either an organic pigment or an inorganic pigment may be used. As the pigment, a pigment which is substantially insoluble or insoluble in water is preferable from the viewpoint of ink colorability.

Examples of the organic pigment include azo pigments, polycyclic pigments, pigment chelates, nitro pigments, nitroso pigments, and aniline black. Among these, azo pigments or polycyclic pigments are more preferable.

Examples of the inorganic pigment include titanium oxides, iron oxides, calcium carbonates, barium sulfates, aluminum hydroxide, barium yellow, cadmium red, chromium yellow, and carbon black. Among these, carbon black is more preferable.

When the organic pigment is used, it is preferable that the average particle size of the organic pigment be smaller from the viewpoint of color reproduction; whereas, be greater from the viewpoints of light resistance. From the viewpoints of balance therebetween, the average particle size is preferably 10 nm to 200 nm, more preferably 10 nm to 150 nm, and still more preferably 10 nm to 120 nm. In addition, the particle size distribution of the organic pigment is not particularly limited, and may be a wide particle size distribution or a monodispersed particle size distribution. In addition, an organic pigment having a monodisperse particle size distribution may be used as a mixture of two or more kinds.

Dispersant

The ink composition according to the embodiment can contain at least one kind of dispersant.

As a dispersant for the pigment, either a polymeric dispersant or a low-molecular-weight surfactant-type dispersant may be used. In addition, either a water-soluble dispersant or a water-insoluble dispersant may be used as the polymeric dispersant.

The low-molecular-weight surfactant-type dispersant can stably disperse a pigment in a water-soluble medium while maintaining the water-based ink at a low viscosity. The low-molecular-weight surfactant-type dispersant is a low-molecular-weight dispersant having a molecular weight of 2,000 or less. In addition, the molecular weight of the low-molecular-weight surfactant-type dispersant is preferably 100 to 2,000 and more preferably 200 to 2,000.

The low-molecular-weight surfactant-type dispersant has a structure having a hydrophilic group and a hydrophobic group. In addition, one or more hydrophilic groups and one or more hydrophobic groups each have to only be independently included in one molecule, and the low-molecular-weight surfactant-type dispersant may include plural kinds of hydrophilic groups and hydrophobic groups. In addition, the low-molecular-weight surfactant-type dispersant may appropriately have a linking group for linking the hydrophilic group and the hydrophobic group.

Examples of the hydrophilic group include anionic groups, cationic groups, nonionic groups, and betaine groups which are combinations thereof. When the hydrophilic group is anionic, any hydrophilic groups may be used as long as they have negative charge. As the hydrophilic group, a phosphoric acid group, a phosphonic acid group, a phosphinic acid group, a sulfuric acid group, a sulfonic acid group, a sulfinic acid group, or a carboxylic acid group is preferable, a phosphoric acid group or a carboxylic acid group is more preferable, and a carboxylic acid group is still more preferable. Any cationic groups may be used as long as they have positive charge. An organic cationic substituent is preferable and a cationic group of nitrogen or phosphorus is more preferable. In addition, a pyridinium cation or ammonium cation group is still more preferable. Examples of the nonionic group include polyethylene oxide, polyglycerin, and a sugar unit.

It is preferable that the hydrophilic group be an anionic group. As the anionic group, a phosphoric acid group, a phosphonic acid group, a phosphinic acid group, a sulfuric acid group, a sulfonic acid group, a sulfinic acid group, or a carboxylic acid group is preferable, a phosphoric acid group or a carboxylic acid group is more preferable, and a carboxylic acid group is still more preferable.

In addition, when the low-molecular-weight surfactant-type dispersant has an anionic hydrophilic group, it is preferable that pKa thereof be greater than or equal to 3 from the viewpoint of being brought into contact with an acidic treatment solution to accelerate an aggregation reaction. The pKa of the low-molecular-weight surfactant-type dispersant is a value which is experimentally obtained from a titration curve with a method in which 1 mmol/L of low-molecular-weight surfactant-type dispersant is dissolved in a tetrahydrofuran-water (3:2=V/V) solution to obtain a solution and this solution is titrated with an acid or an alkali aqueous solution. When the pKa of the low-molecular-weight surfactant-type dispersant is greater than or equal to 3, 50% or higher of anionic groups are theoretically undissociated when being in contact with a solution at pH 3. Therefore, the water solubility of the low-molecular-weight surfactant-type dispersant significantly deteriorates and an aggregation reaction is caused. That is, it is preferable that the low-molecular-weight surfactant-type dispersant contain a carboxylic acid group as an anionic group from the viewpoints of improving aggregation reactivity.

The hydrophobic group has, for example, a hydrocarbon-based, fluorocarbon-based, or silicone-based structure, and it is preferable that the hydrophobic group have a hydrocarbon-based structure. In addition, the hydrophobic group may have a linear or branched structure. In addition, the hydrophobic group may have one or two or more chained structures. When two or more chained structures are used, the low-molecular-weight surfactant-type dispersant may include plural kinds of hydrophobic groups.

In addition, as the hydrophobic group, a hydrocarbon group having 2 to 24 carbon atoms is preferable, a hydrocarbon group having 4 to 24 carbon atoms is more preferable, and a hydrocarbon group having 6 to 20 carbon atoms is still more preferable.

Among the polymeric dispersants, examples of the water-soluble dispersant include hydrophilic polymer compounds. Examples of natural hydrophilic polymer compounds include plant polymers such as gum arabic, gum tragacanth, guar gum, gum karaya, locust bean gum, arabinogalactan, pectin, and quince seed starch; algae polymers such as alginic acid, carrageenan, and agar; animal polymers such as gelatin, casein, albumin, and collagen; and microbial polymers such as xanthene gum and dextran; natural polymer compound such as shellac.

In addition, examples of hydrophilic polymer compounds obtained by chemically modifying natural raw materials include cellulose polymers such as methyl cellulose, ethyl cellulose, hydroxyethyl cellulose, hydroxypropyl cellulose, and carboxymethyl cellulose; starch polymers such as sodium starch glycolate, and sodium starch phosphate; and algae polymers such as sodium alginate and propylene glycol alginate.

Furthermore, examples of synthetic hydrophilic polymer compounds include vinyl polymers such as polyvinyl alcohol, polyvinyl pyrrolidone, and polyvinyl methyl ether; non-crosslinked polyacrylamides, polyacrylic acids, and alkali metal salts thereof; acrylic resins such as water-soluble styrene acrylic resins and water-soluble styrene maleic acid resins; water-soluble vinylnaphthalene acrylic resins; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, and a salt of a cationic functional group such as a quaternary ammonium group or an amino group.

Among these, a water-soluble dispersant, to which a carboxylic group is introduced, is preferable as the hydrophilic polymer compound, for example, a copolymer with an acrylic acid, a methacrylic acid, and another hydrophilic monomer containing carboxyl group.

Among the polymeric dispersants, examples of the water-insoluble dispersants include polymers having both a hydrophobic group and a hydrophilic group. Examples thereof include styrene-(meth)acrylic acid copolymers, styrene-(meth)acrylic acid-(meth)acrylic acid ester copolymers, (meth)acrylic acid ester-(meth)acrylic acid copolymers, polyethylene glycol(meth)acrylate-(meth)acrylic acid copolymers, vinyl acetate-maleic acid copolymers, and styrene-maleic acid copolymers.

The weight average molecular weight (Mw) of the polymeric dispersant is preferably 3,000 to 100,000, more preferably 5,000 to 50,000, still more preferably 5,000 to 40,000, and even still more preferably 10,000 to 40,000.

The polymeric dispersant contains preferably a polymer having a carboxyl group, more preferably a polymer having a carboxyl group and an acid value of 100 mgKOH/g or less, and still more preferably a polymer having a carboxyl group and an acid value of 25 mgKOH/g to 100 mgKOH/g, from the viewpoint of self-dispersibility and aggregation rate when being in contact with the treatment solution. In particular, when the ink composition according to the embodiment is used in combination with the treatment solution for aggregating components in the ink composition, a polymeric dispersant having a carboxylic group and an acid value of 25 mgKOH/g to 100 mgKOH/g is effective. The treatment solution will be described below.

The mixing mass ratio (p:s) of the pigment (p) to the dispersant (s) is preferably 1:0.06 to 1:3, more preferably 1:0.125 to 1:2, and still more preferably 1:0.125 to 1:1.5.

A dye may be used instead of the pigment. When a dye is used, a dye which is supported on a water-insoluble carrier can be used. The carrier (water-insoluble colorant particles) which supports the dye can be used with a dispersant as an aqueous dispersion. As the dispersant, the above-described dispersants are preferably used.

From the viewpoint of the light resistance and quality of an image, it is preferable that the ink composition according to the embodiment contain a pigment and a dispersant and it is more preferable that the ink composition contain an organic pigment and a polymeric dispersant as a water-dispersible pigment in which at least a part of surfaces of the pigment particles are coated with the polymeric dispersant. Furthermore, it is still more preferable that the ink composition contain an organic pigment and a polymeric dispersant having a carboxyl group as a water-dispersible pigment in which at least a part of surfaces of the pigment particles are coated with the polymeric dispersant having a carboxyl group. From the viewpoint of aggregability, it is preferable that the pigment be a water-insoluble pigment which is coated with a polymeric dispersant having a carboxyl group.

The average particle size of the pigment in the dispersion state is preferably 10 nm to 200 nm, more preferably 10 nm to 150 nm, and still more preferably 10 nm to 100 nm. When the average particle size is less than or equal to 200 nm, color reproduction is improved and application characteristics when ink droplets are applied with an ink jet method are improved. When the average particle size is greater than or equal to 10 nm, light resistance is improved. In addition, the particle size distribution of the colorant is not particularly limited, and may be a wide particle size distribution or a monodispersed particle size distribution. In addition, a colorant having a monodisperse particle size distribution may be used as a mixture of two or more kinds. The average particle size of the pigment in the dispersion represents a value in a state where the ink is prepared (liquid ink is prepared). However, the same shall be applied to a so-called concentrated ink dispersion which is the previous state to the state where the ink is prepared (liquid ink is prepared).

The average particle size of the pigment in the dispersion state and the average particle size and particle size distribution of the polymer particles described below can be obtained by measuring the volume average particle size according to a dynamic light scattering method using a Nanotrac particle size distribution analyzer UPA-EX150 (manufactured by Nikkiso Co., Ltd.).

As the pigment, one kind may be used alone, or two or more kinds may be used in combination.

The content of the pigment in the ink composition is preferably 1% by mass to 25% by mass and more preferably 2% by mass to 15% by mass with respect to the total mass of the ink composition, from the viewpoint of image density.

Polymerization Initiator

The ink composition according to the embodiment can contain at least one kind of polymerization initiator, which initiates the polymerization of polymerizable compounds with active energy rays, with or without being included in the treatment solution described below. The polymerization initiator can be used alone or as a mixture of two or more kinds thereof, or may be used in combination with a sensitizer.

The polymerization initiator can be appropriately selected among compounds which can initiate the polymerization of polymerizable compounds with active energy rays. Examples of the polymerization initiator include polymerization initiators (for example, light polymerization initiators) which form active species with radioactive rays, light rays, or electron rays.

Examples of the light polymerization initiators include acetophenone, 2,2-diethoxyacetophenone, p-dimethylamino acetophenone, p-dimethylamino propiophenone, benzophenone, 2-chlorobenzophenone, p,p'-dichlorobenzophenone, p,p'-bis(dimethylamino)benzophenone, Michler's ketone, benzil, benzoin, benzoin methyl ether, benzoin ethyl ether, benzoin isopropyl ether, benzoin n-propyl ether, benzoin isopropyl ether, benzoin n-butyl ether, benzoin dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propan-1-one, 2-hydroxy-2-methyl-1-phenyl-1-one, 1-(4-isopropylphenyl)-2-hydroxy-2-methylpropane-1-one, and methyl benzoyl formate. Furthermore, examples thereof include aromatic diazonium salts, aromatic halonium salts, aromatic sulfonium salts, and metallocene compounds, for example, triphenyl sulfonium hexafluorophosphate and diphenyl iodonium hexafluorophosphate.

When the ink composition contains the polymerization initiator, the content of the polymerization initiator in the ink composition is preferably 1% by mass to 40% by mass and more preferably 1% by mass to 10% by mass with respect to the specific monomer. When the content of the polymerization initiator is greater than or equal to 1% by mass, the exuding of uncured components from a cured film (image) of the ink composition is suppressed and the strength of the cured film is high. When the content is less than or equal to 40% by mass, ink discharge stability is superior.

Examples of the sensitizer include amine-based compounds (for example, aliphatic amine, amine having an aromatic group, and piperidine); ureas (for example, allyl-based urea and o-tolyl thiourea); sulfur compounds (for example, sodium diethyl dithiophosphate, soluble salts of aromatic sulfinic acid); nitrile-based compounds (for example, N,N-di-substituted-p-aminobenzonitrile); phosphorus compounds (for example, tri-n-butylphosphine and sodium diethyl dithiophosphate); nitrogen compounds (for example, Michler's ketone, N-nitroso hydroxylamine derivatives, oxazolidine compounds, tetrahydro-1,3-oxazine compounds, condensates of formaldehyde or acetaldehyde and diamine); chloride compounds (for example, carbon tetrachloride and hexachloro ethane); reaction products of an epoxy resin and amine; and triethanolamine triacrylate.

The ink composition according to the ink composition can contain the sensitizer within a range not departing from the effects of the embodiment.

Water-Soluble Organic Solvent

The ink composition according to the embodiment may contain a water-soluble organic solvent. When the ink composition contains a water-soluble organic solvent, it is preferable that the content thereof be small. In the embodiment, it is preferable that the content of the water-soluble organic solvent be less than 3% by mass with respect to the total mass of the ink composition.

In the embodiment, the content of the water-soluble organic solvent being less than 3% by mass represents that the ink composition contains a small amount of the water-soluble organic solvent or preferably does not contain the water-soluble organic solvent (content: 0% by mass).

The water-soluble organic solvent has effects of preventing the ink composition from being dried, wetting the ink composition, and accelerating the permeation of the ink composition into paper. Examples of a water-soluble organic solvent which may be included in the ink composition are as follows.

Examples thereof include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol; polyols such as alkane diols including 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; sugars, sugar alcohols, hyaluronic acids, alkyl alcohols having 1 to 4 carbon atoms, glycol ethers, 2-pyrrolidone, and N-methyl-2-pyrrolidone which are described in paragraph 0116 of JP-2011-42150A; and alkylene oxide adducts of glycerin which are described in paragraphs 0121 to 0125 of JP-2011-42150A. Among these solvents, one kind can be used alone or two or more kinds can be appropriately selected and used. Polyols are effective as an anti-drying agent or wetting agent, and examples thereof include polyols described in paragraph 0117 of JP-2011-42150A. In addition, polyol compounds are preferable as a penetrant. Examples of an aliphatic acid diol include examples described in paragraph 0117 of JP-2011-42150A.

Other Components

The ink composition according to the embodiment can contain other additives in addition to the above-described components. Examples of other additives include well-known additives such as a polymerization inhibitor, an anti-drying agent (wetting agent), an anti-fading agent, an emulsion stabilizer, a permeation accelerator, an ultraviolet absorber, a preservative, an antifungal agent, a pH regulator, a surface tension regulator, a defoaming agent, a viscosity adjusting agent, a dispersion stabilizer, an anti-rust agent, and a chelating agent. In the case of an ink composition, these various kinds of additives are directly added to the ink composition. Generally, when an oil dye is used as a dispersion, a dye dispersion is prepared and then the additives are added to the dispersion. However, the additives may be added to an oil phase or a water phase during the preparation.

Liquid Composition (Treatment Solution)

A liquid composition, which contains the ink set according to the embodiment, contains aggregation components for aggregating the ink composition according to the embodiment.

Optionally, the liquid composition may further contain a polymerization initiator and various additives. By applying the liquid composition onto a recording medium before applying the ink composition according to the embodiment, high-speed ink jet recording can be performed. In addition, even when high-speed recording is performed, an image having superior drawing properties such as density or resolution (for example, the reproduction of thin lines and fine portions) can be obtained.

As the aggregation components, any one of compounds capable of changing the pH of the ink composition, polyvalent metal salts, and cationic polymers can be used. From the viewpoints of aggregability of components in the ink composition, compounds capable of changing the pH of the ink composition are preferable, and compounds capable of lowering the pH of the ink composition are more preferable. Examples of the compounds capable of lowering the pH of the ink composition include acidic materials. Preferable examples of the acidic materials include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pylon carboxylic acid, pyrrole carboxylic acid, furan carboxylic acid, pyridine carboxylic acid, coumaric acid, thiophene carboxylic acid, nicotinic acid, derivatives thereof, and salts thereof. Among the acidic materials, one kind may be used alone or two or more kinds may be used in combination.

When the liquid composition contains an acidic material, the pH (25° C.) of the liquid composition is preferably less than or equal to 6, more preferably less than or equal to 4, more preferably 1 to 4, and even still more preferably 1 to 3.

At this time, the pH (25° C.) of the ink composition is preferably greater than or equal to 7.5 (more preferably greater than or equal to 8.0). From the viewpoints of image density, resolution, and high-speed ink jet recording, it is preferable that the pH (25° C.) of the ink composition be greater than or equal to 8.0 and the pH (25° C.) of the liquid composition be 0.5 to 4.

Among the acidic materials, an acidic material having high water solubility is preferable as the aggregation component. From the viewpoints of improving aggregability and fixing the entire ink composition, an organic acid is preferable, a divalent or higher valent organic acid is more preferable, and a divalent or trivalent acidic material is still more preferable. As the divalent or higher valent organic acid, an organic acid having a first pKa of 3.5 or lower is preferable and an organic acid having a first pKa of 3.0 or lower is more preferable. Specifically, preferable examples thereof include phosphoric acid, oxalic acid, malonic acid, and citric acid.

Polyvalent metal salts and cationic polymers, which can be used as the aggregation components, are described in paragraph 0155 to 0156 of JP-2011-042150A, and can be applied to the embodiment.

As the aggregation component, one kind can be used alone or a mixture of two or more kinds can be used. The content of the aggregation component, which aggregates the components of the ink composition, in the treatment solution is preferably 1% by mass to 50% by mass, more preferably 3% by mass to 45% by mass, and still more preferably 5% by mass to 40% by mass.

The ink composition according to the embodiment can contain at least one kind of polymerization initiator, which initiates the polymerization of polymerizable compounds in the ink composition with active energy rays, with or without being included in the ink composition. The polymerization initiator can be used alone or as a mixture of two or more kinds thereof, or may be used in combination with a sensitizer.

Similarly to the ink composition, the polymerization initiator used in the liquid composition can be appropriately selected from among compounds which can initiate the polymerization of polymerizable compounds with active energy rays. Examples of the polymerization initiator include polymerization initiators (for example, light polymerization initiators) which form active species with radioactive rays, light rays, or electron rays. The details of the light polymerization initiators are the same as those in the above-described ink composition.

In the embodiment, the polymerization initiator may be included in either or both of the ink composition and the liquid composition. From the viewpoints of polymerization reactivity and curability and furthermore, of improving the adhesion and scratch resistance of an image, it is preferable that the polymerization initiator be included in at least the ink composition.

In addition, the liquid composition may further contain other additives as other components within a range not impairing the effects of the embodiment. Examples of other additives include well-known additives such as an anti-drying agent (wetting agent), an anti-fading agent, an emulsion stabilizer, a permeation accelerator, an ultraviolet absorber, a preservative, an antifungal agent, a pH regulator, a surface tension regulator, a defoaming agent, a viscosity adjusting agent, a dispersant, a dispersion stabilizer, an anti-rust agent, and a chelating agent.

The ink composition and the liquid composition each included in the ink set according to the embodiment may be independently used alone or in a combination of plural kinds thereof.

In addition, it is preferable that the ink set according to the embodiment contain a black ink (black ink composition). Examples of the black ink include ink compositions in which the pigment included in the ink composition is a black pigment such as black titanium oxide or carbon black.

Pretreatment Step

The image forming method according to the embodiment includes a pretreatment step.

In the pretreatment step, the above-described liquid composition (treatment solution) is applied onto a recording medium.

In the pretreatment step, the liquid composition (treatment solution) contains the aggregation component capable of aggregating components in the ink composition when being in contact with the ink composition. Therefore, by applying the liquid composition (treatment solution) onto a recording medium in advance, high-speed ink jet recording can be performed. In addition, even when high-speed recording is performed, an image having superior drawing properties such as density or resolution (for example, the reproduction of thin lines and fine portions) can be obtained.

The liquid composition, applied onto the recording medium, contacts the ink composition to form an image. In this case, the pigment and dispersed particles such as the polymer particles in the ink composition aggregate and are fixed on the recording medium to form an image.

The liquid composition can be applied onto a recording medium with a well-known method such as an ink jet method, a coating method, or a dipping method.

Examples of the coating method include well-known coating methods using a direct gravure coater, an offset gravure coater, an air doctor coater, a blade coater, a rod coater, a knife coater, a squeeze coater, a reverse roll coater, or a bar coater.

The ink jet method is not particularly limited, and any well-known method may be used, for example, a charge control method of using electrostatic attraction force to discharge ink; a drop-on-demand method (pressure pulse method) of using a vibration pressure of a piezoelectric element; an acoustic ink jet method of converting electric signals into acoustic beams (radiation pressure) to discharge a liquid composition; and a thermal ink jet method of heating a liquid composition to form bubbles and using a generated pressure thereof.

The pretreatment step is performed at least before an image forming step described below using the ink composition.

Specifically, a configuration is preferable in which the liquid composition (treatment solution) for aggregating the pigment and/or the polymer particles in the ink composition is applied onto a recording medium in advance; the ink composition is applied onto the recording medium so as to come into contact with the liquid composition applied on the recording medium; and thus, an image is formed. As a result, a drying effect is further improved, an image is formed at high speed, and an image having high density and resolution is obtained.

The addition amount of the liquid composition (treatment solution) is not particularly limited as long as the ink composition aggregates. The addition amount of the aggregation component is preferably greater than or equal to 0.1 $g/m^2$ and more preferably 0.2 $g/m^2$ to 0.7 $g/m^2$. When the addition amount of the aggregation component is greater than or equal to 0.1 $g/m^2$, superior high-speed aggregability can be maintained according to various forms of the ink composition. In addition, it is preferable that the addition amount of the aggregation component be less than or equal to 0.7 g/m², from the viewpoint that there are no adverse effects (changes in brilliance) on surface properties of a recording medium to which the ink composition is applied.

The image forming method according to the embodiment may include a step of applying the liquid composition onto a recording medium, on which an image is formed, after the image forming step.

In addition, in the embodiment, it is preferable that a liquid composition heating and drying step of heating and drying the liquid composition (treatment solution) on a recording medium be further provided between the pretreatment step and the image forming step. By heating and drying the liquid composition in advance before the image forming step, ink colorability is improved, for example, bleeding is prevented. As a result, a visible image having superior color density and hue can be formed.

The liquid composition (treatment solution) can be heated and dried by well-known heating means such as a heater, blowing means for blowing air such as a drier, or a combination thereof. Examples of the heating method include a method of applying heat with a heater or the like from the opposite surface to a surface of a recording medium onto which the liquid composition is applied; a method of blowing warm air or hot air to a surface of a recording medium onto which the liquid composition is applied; and a heating method using an infrared heater. Heating may be performed in a combination of plural methods among the above-described methods.

Recording Medium

The recording medium used in the image forming method according to the embodiment is not particularly limited. Generally, when an image is formed with a general ink jet method using a water-soluble ink on general printing paper such as so-called high-quality paper, coated paper, or art paper, which is mainly composed of cellulose, the ink is absorbed and dried at a relatively slow rate, color materials easily move after the ink droplets are applied, and thus image quality easily deteriorates. However, in the image forming method according to the embodiment, the movement of color materials is suppressed and a high-quality image having superior color density and hue can be formed.

The problem to solve on which the embodiment particularly focuses is that, when the content of the polymer particles in the ink composition is low, the improvement of the discharge property of the ink composition and the high brilliance of an image are difficult to realize at the same time. This problem does not easily occur on plain paper used as a recording medium which easily absorbs water. Regarding coated paper, it is difficult for the recording medium to absorb the liquid composition (treatment solution), applied onto the recording medium, and water (liquid components such as water which can be absorbed in the recording medium by capillary action) included in the ink composition. Therefore, when coated paper is compared to plain paper, it is difficult for the bleeding of an image to occur, a solvent is likely to remain in a liquid film, and thus it is difficult to advance the curing reaction of a polymerizable compound. Accordingly, an image recording method of the related art has a tendency that the curing of a liquid film is insufficient and thus uncured components exude from the cured film (image); and that a liquid film is excessively dried in order to sufficiently remove a solvent from a liquid film and thus the brilliance of a surface of the cured film (image), obtained by curing the liquid film, deteriorates due to overdrying.

However, in the image forming method according to the embodiment, in order to form an image, the specific monomer having high curing reactivity is used and the water content of an image is controlled. Therefore, even when coated paper is used as a recording medium, the brilliance of an image can be improved while the content of the polymer particles in the ink composition is reduced to promote the discharge of the ink composition.

Therefore, the image forming method according to the embodiment is desirable when an image is formed on a recording medium such as coated paper which does not easily absorb water of the ink composition.

In the embodiment, it is preferable that coated paper have a pigment layer on at least one surface of a support, which includes cellulose pulp as a major component. For example, coated paper, which is generally used for offset printing and the like, is obtained by coating a surface of high-quality paper, neutral paper, or the like, which is mainly composed of cellulose and is generally not subjected to surface treatment, with a coating material containing a pigment to provide a coating layer. Generally, when an image is formed on coated paper as a recording medium with aqueous ink jet printing, problems regarding quality such as unevenness in brilliance or wear resistance easily occur. However, in the image forming method according to the embodiment, the water content of an image is controlled to dry the image and thus the unevenness in brilliance is suppressed; and the specific monomer having high curing reactivity is used to form a cured film (image) and thus the wear resistance of the image is superior.

The above-described coated paper has a single pigment layer or multiple pigment layers on at least one surface of a support, which includes cellulose pulp as a major component. Examples thereof include a recording medium which has a transfer amount of pure water of 1 ml/m² to 15 ml/m² at a contact time of 100 ms and a transfer amount of 2 ml/m² to 20 ml/m² at a contact time of 400 ms when measured with a dynamic scanning absorptometer.

Support

As the support which includes cellulose pulp as a major component, a support is used which are made of raw materials, obtained by mixing chemical pulp, mechanical pulp, and recycled pulp according to a given ratio, by a paper machine such as a fourdrinier former, a gap-type twin wire former, or a hybrid former in which the last half of a fourdrinier portion is composed of a twin wire. Optionally, an internal sizing agent, a yield improver, and a paper strong agent are added to the raw materials. "The major component" described herein represents a component having a content of 50% by mass or greater with respect to the total mass of the support.

The details of the pulp used for the support can be found in paragraph 0024 of JP-2011-42150A. In addition, a loading material, an internal sizing agent, or the like can be used for the support. The details of the filler and the internal sizing agent can be found in paragraphs 0025 to 0027 of JP-2011-42150A.

Pigment Layer

The above-described coated paper has a single pigment layer or multiple pigment layers on at least one surface of the support.

Regarding a pigment used for the pigment layer, the kind thereof is not particularly limited, and a well-known organic pigment or inorganic pigment of the related art may be used. Specific examples of the pigment can be found in paragraph 0029 of JP-2011-42150A. A white inorganic pigment is preferable from the viewpoints of maintaining the transparency of a recording medium and improving image density.

The pigment layer can further contain additives such as an aqueous binder, an antioxidant, a surfactant, a defoaming agent, a foam suppressor, a pH regulator, a curing agent, a colorant, a fluorescent brightening agent, a preservative, and a water resistant additive. The details of the aqueous binder can be found in paragraph 0030 of JP-2011-42150A.

A method of forming the pigment layer on the support is not particularly limited and can be appropriately selected according to the purpose. For example, base paper is coated with a dispersion in which a pigment is dispersed in water, followed by drying to form a pigment layer. The amount of the pigment in the pigment layer is preferably 0.1 g/m$^2$ to 20 g/m$^2$. When the amount of the pigment is greater than or equal to 0.1 g/m$^2$, blocking resistance is further improved. In addition, when the amount of the pigment is less than or equal to 20 g/m$^2$, there are advantages in terms of brittleness. The content of the pigment in the pigment layer is preferably greater than or equal to 10% by mass and more preferably greater than or equal to 14% by mass with respect to the total solid content of the pigment layer.

Regarding the coated paper, it is preferable that the amount of pure water transferred onto the coated paper be 1 ml/m$^2$ to 15 ml/m$^2$ at a contact time of 100 ms and be 2 ml/m$^2$ to 20 ml/m$^2$ at a contact time of 400 ms when measured with a dynamic scanning absorptometer. That is, in the embodiment, an image in which the unevenness in brilliance is suppressed can be formed on a recording medium in which the transfer amount is within the above-described range and the ink absorption amount is relatively small. The transfer amount being greater than or equal to 1 ml/m$^2$ at a contact time of 100 ms and being greater than or equal to 2 ml/m$^2$ at a contact time of 400 ms represents that the absorption rate is slow but a recording medium has a pigment layer which can absorb ink. In addition, the transfer amount being less than or equal to 15 ml/m$^2$ at a contact time of 100 ms and being less than or equal to 20 ml/m$^2$ at a contact time of 400 ms represents that the ink absorption amount is relatively small. That is, "the amount of pure water transferred onto a recording medium which is measured with a dynamic scanning absorptometer" being within the above-described range represents that the recording medium has a pigment layer and the permeation amount of ink is small.

The dynamic scanning absorptometer (DSA, Japan TAPPI Journal, Vol. 48, May 1994, pp. 88 to 92, Shigenori Kuga) described herein is a device which can accurately measure the liquid absorption amount within a very short time. The dynamic scanning absorptometer is a device which automatically performs the measurement in the following method: (1) the liquid absorption rate is directly read from the movement of a meniscus in a capillary; (2) the shape of a sample is set to a disk shape and a liquid absorption head thereon is scanned in a spiral shape; and (3) the scanning rate is automatically changed according to a preset pattern and the measurement is performed the number of times required for each sample. The head for supplying liquid into a paper sample is connected to the capillary through a Teflon (trade name) pipe and the position of the meniscus in the capillary is automatically read by an optical sensor. Specifically, the transfer amount of pure water or ink is measured using a dynamic scanning absorptometer (K350 series D-type, manufactured by Kyowa Co., Ltd.). The transfer amount at contact times of 100 ms and 400 ms can be obtained by interpolation from measured values of the transfer amount at contact times neighboring each contact time under conditions of 23° C. and 50% RH.

In the embodiment, the amount of pure water transferred onto the recording medium at a contact time of 100 ms, which is measured with the dynamic scanning absorptometer, is preferably 1 ml/m$^2$ to 15 ml/m$^2$, more preferably 1 ml/m$^2$ to 10 ml/m$^2$, and still more preferably 1 ml/m$^2$ to 8 ml/m$^2$. When the transfer amount of pure water at a contact time of 100 ms is excessively small, beading is likely to occur. In addition, when the transfer amount is much greater than 15 ml/m$^2$, the diameter of ink dots after recording may be excessively smaller than a desired diameter.

Beading described herein is a phenomenon in which, during a period from the application of a previous ink droplet to the application of a subsequent ink droplet onto a recording medium, the previous ink droplet in the liquid state remains on a surface of the recording medium without being absorbed into the recording medium and is mixed with the subsequent ink droplet; and as a result, a part of colorant in the ink aggregates and causes unevenness in density.

In the embodiment, the transfer amount of pure water at a contact time of 400 ms, which is measured with the dynamic scanning absorptometer, is preferably 2 ml/m$^2$ to 20 ml/m$^2$, more preferably 2 ml/m$^2$ to 15 ml/m$^2$, and still more preferably 2 ml/m$^2$ to 10 ml/m$^2$. When the transfer amount of pure water at a contact time of 400 ms is excessively small, a drying property is insufficient and spur marks are easily generated. In addition, when the transfer amount is much greater than 20 ml/m$^2$, bleeding is likely to occur and the brilliance of a dried image portion is likely to be low.

The pigment layer includes a pigment and a pigment binder as a major component. The transfer amount can be adjusted to be reduced by increasing the mixing amount of resins, and the transfer amount can be adjusted to increase by increasing the mixing amount of the pigment. Furthermore, the particle size, for example, can be reduced by increasing the specific surface area of pigment particles constituting the pigment layer, and the transfer amount can increase by using a kind of pigment having a large specific surface area.

As the coated paper, for example, lightweight coated paper or fine coated paper is preferably used, and general coated paper which is commercially available can be used. As examples of the coated paper, coated paper for general printing can be used. Specifically, examples of A2 glossy paper include "OK TOPCOAT+" (manufactured by Oji Paper Co., Ltd.), "AURORA COAT" (manufactured by Nippon Paper Group), "PEARL COAT" (manufactured by Mitsubishi Paper Mills, Ltd.), "S-UTRILLO COAT" (manufactured by Daio Paper Corp.), "MU COAT NEOS" (manufactured by Hokuetsu Kishu Paper Co., Ltd.), and "RAICHO COAT" (manufactured by Chuetsu Pulp & Paper Co., Ltd.); examples of A2 matte paper include "NEWAGE" (manufactured by Oji Paper Co., Ltd.), "OK TOPCOAT MAT" (manufactured by Oji Paper Co., Ltd.), "U-LITE" (manufactured by Nippon Paper Group), "NEW V MAT" (manufactured by Mitsubishi Paper Mills, Ltd.), and "RAICHO MAT COAT N" (manufactured by Chuetsu Pulp & Paper Co., Ltd.); examples of A1 dull art paper include "SATIN KINFUJI+" (manufactured by Oji Paper Co., Ltd.), "SUPER MAT ART" (manufactured by Mitsubishi Paper Mills, Ltd.), and "RAICHO DULL ART" (manufactured by Chuetsu Pulp & Paper Co., Ltd.); and examples of A0 art paper include "SA KINFUJI+" (manufactured by Oji Paper Co., Ltd.), "HIGH-GRADE ART" (manufactured by Mitsubishi Paper Mills, Ltd.), "RAICHO SUPER ART N" (manufactured by Chuetsu Pulp & Paper Co., Ltd.), "ULTRA SATIN KINFUJI+" (manufactured by Oji Paper Co., Ltd.), and "DIA PREMIER DULL ART" (manufactured by Mitsubishi Paper Mills, Ltd.).

Image Forming Step

The image forming step is a step which is performed after the pretreatment step and is a step in which the ink composition according to the embodiment is applied onto a recording medium, onto which the liquid composition is applied, with an ink jet method to form an image.

When an image is formed with an ink jet method, the liquid droplets of the ink composition are discharged onto the above-described coated paper by applying energy and thus an image is formed. As the ink jet method, a method described in paragraph 0093 to 0105 of JP-2003-306623A can be applied.

The details of the ink jet method are the same as those described as one of the application methods of the liquid composition in the pretreatment step. In the above-described ink jet method, the liquid composition only needs to be replaced with the ink composition.

As the ink jet method, an ink jet method described in JP-554-59936A can be effectively used in which the volume of ink is rapidly changed by the action of heat energy and the ink is discharged from nozzles due to the acting force generated by the volume change.

The above-described ink jet method include a method of discharging multiple droplets of an ink having a low concentration, which is called a photo ink, in a small volume; a method of using multiple inks having substantially the same hue and different concentrations to improve image quality; and a method using a colorless transparent ink.

In addition, in the ink forming step, an image can be formed by, for example, changing the transport rate of a recording medium. The transport rate is not particularly limited within a range not impairing image quality, and is preferably 100 mm/s to 3,000 mm/s, more preferably 150 mm/s to 2,700, and still more preferably 250 mm/s to 2,500 mm/s.

In the embodiment, it is preferable that the maximum application amount of the ink composition onto a recording medium be less than or equal to 15 ml/m$^2$. When the maximum application amount is less than or equal to 15 ml/m$^2$, the adhesion of an image is further improved. Furthermore, from the viewpoints of the adhesion and density of an image, the maximum application amount is preferably 8 ml/m$^2$ to 15 ml/m$^2$, 8 ml/m$^2$ to 12 ml/m$^2$, and still more preferably 8 ml/m$^2$ to 11 ml/m$^2$. The maximum application amount can be controlled by adjusting a method of discharging the ink composition from discharge nozzles.

Drying Step

The drying step is a step which is performed after the image forming step and is a step in which an image formed on a recording medium is dried at a surface temperature of the image of 35° C. to 55° C. until a difference between a residual water content of a non-image portion on the recording medium where the ink composition is not applied and a residual water content of a portion of the entire image where an application amount of the ink composition is the maximum is 2 g/m$^2$ to 4 g/m$^2$.

In the embodiment, "a region on a recording medium where the ink composition is not applied" is referred to as "an image" and "a region where the ink composition is not applied" is referred to as "a non-image portion".

In addition, "an image", which is a region on a recording medium where the ink composition is not applied, is a liquid film composed of the ink composition in the image forming step and the drying step; and is a cured film after curing the liquid film of the ink composition in an irradiation step described below.

In the drying step, at least a part of a solvent in an image (liquid film of the ink composition), which is formed on a recording medium by applying the ink composition in the image forming step, is dried and removed. When the ink composition contains only water as the solvent, at least a part of water is removed. When the ink composition contains another solvent such as a water-soluble organic solvent as well as water, at least a part of water and the water-soluble organic solvent is dried and removed.

By providing the drying step before the irradiation step described below, the content of water or the water-soluble organic solvent in the ink composition is reduced. As a result, the curing reaction of polymerizable compounds advances more satisfactorily in the irradiation step. In particular, when an image is formed at high speed with a single-pass image forming method of discharging ink to form one line for each scanning, the sensitivity which satisfies image forming properties can be obtained.

In the drying step, an image or a recording medium is heated to set the surface temperature of the image (liquid film of the ink composition obtained in the image forming step) to be 35° C. to 55° C. When the drying temperature is less than 35° C., a solvent such as water included in the liquid film is not sufficiently removed. When the drying temperature is greater than 55° C., a solvent included in the liquid film is excessively removed to cause overdrying. As a result, the brilliance of an image deteriorates and the brilliance is likely to be uneven.

The drying temperature is preferably 37.5° C. to 52.5° C. and more preferably 40° C. to 50° C.

The surface temperature of an image can be measured with a thermocouple or a radiation thermometer.

In the drying step according to the embodiment, that a solvent such as water and a water-soluble organic solvent, included in an image (liquid film), is dried so as to remain in the image (liquid film) without being completely dried. The solvent may remain in a pigment layer of a recording medium.

Specifically, the solvent is dried such that water remains in an image in which a difference ($\Delta W = W_{max} - W_0$) between a residual water content ($W_0$) of a non-image portion on the recording medium where the ink composition is not applied and a residual water content ($W_{max}$) of a portion of the image where an application amount of the ink composition is the maximum is 2 g/m$^2$ to 4 g/m$^2$.

When $\Delta W$ is less than 2 g/m$^2$, it is difficult for the curing action to advance, the brilliance of an image, which is a cured film obtained by curing a liquid film, deteriorates, and thus the brilliance is uneven. When $\Delta W$ is greater than 4 g/m$^2$, the ink composition is not sufficiently cured, uncured components exude from the cured film, and the strength of the image deteriorates.

The residual water content ($W_0$) of the non-image portion and the residual water content ($W_{max}$) of the portion where the application amount of the ink composition is maximum are obtained by measuring, before the irradiation step and after the drying step, the water content of the non-image portion on the recording medium and the water content of the portion on the recording medium where the application amount of the ink composition is maximum.

The respective water contents are measured with the Karl-Fischer method. In the embodiment, the water contents can be measured with a Karl-Fischer moisture meter MKA-520 (manufactured by Kyoto Electronics Manufacturing Co., Ltd.) under ordinary measurement conditions.

It is preferable that $\Delta W$ be 2 g/m$^2$ to 3 g/m$^2$.

The transport rate of a recording medium in the drying step is not particularly limited within a range not impairing image quality. Drying processing may be performed at 300 mm/s to 1200 mm/s of the transport rate. In the image forming method according to the embodiment, the ink composition contains the specific monomer having high curing reactivity. Therefore, even when a liquid film is dried at a high transport rate in a single-pass image forming method, a cured film having superior film strength can be formed in the irradiation step.

The transport rate is preferably 400 mm/s to 1,000 mm/s and more preferably 500 mm/s to 800 mm/s.

In addition, it is preferable that drying start within 5 seconds from when the liquid droplets of the ink composition are applied onto a recording medium. "Drying starting within 5 seconds from the application" represents that air blows or heat is applied to an image within 5 seconds from the application of the ink droplets. For example, drying starts within 5 seconds from the application of the ink droplets by transporting a recording medium into a drying region within 5 seconds from the application.

It is more preferable that drying start within 3 seconds from the application of the ink droplets.

Drying is performed by heating means for applying heat with a heating element such as a nichrome wire heater, blowing means for blowing air such as a drier, or a combination thereof. Examples of the heating method include a method of applying heat with a heater or the like from the opposite surface to an image-formed surface of a recording medium; a method of blowing warm air or hot air to an image-formed surface of a recording medium; and a heating method using an infrared heater. Heating may be performed in a combination of plural methods among the above-described methods.

Irradiation Step

In the irradiation step, the formed image (the liquid film of the ink composition after the drying step) is irradiated with active energy rays to cure the ink composition. The polymerizable compounds in the ink composition are polymerized by the irradiation of active energy rays and thus the cured film containing a pigment is formed. As a result, the scratch resistance of the formed image is further improved.

The active energy rays are not particularly limited as long as the polymerizable compounds can be polymerized with them, and examples thereof include ultraviolet rays and electron rays. Among these, ultraviolet rays are preferable from the viewpoint of versatility. In addition, examples of a source of the active energy rays include an ultraviolet irradiation lamp (for example, a halogen lamp or a high-pressure mercury lamp), a laser, an LED, and an electron ray irradiation device.

Any well-known means may be used as the means for irradiating ultraviolet rays, but in particular, an ultraviolet ray irradiation lamp is preferable. Preferable examples of the ultraviolet ray irradiation lamp include a so-called low-pressure mercury lamp having a mercury vapor pressure of 1 Pa to 10 Pa when turned on, a high-pressure mercury lamp, a mercury lamp having a coated phosphor, and a UV-LED light source. The emission spectrum of the mercury lamp and the UV-LED light source in the ultraviolet range is preferably less than or equal to 450 nm and more preferably 184 nm to 450 nm, which is suitable for efficiently causing a reaction of polymerizable compounds in a black ink composition or a colored ink composition. In addition, such lamps are suitable because a small power source can be used when a power source is mounted onto a printer. Examples of the mercury lamps, which have been put into practice, include a metal halide lamp, a high-pressure mercury lamp, an ultrahigh-pressure mercury lamp, a xenon flash lamp, a deep UV lamp, a lamp which externally excites a mercury lamp using microwaves without electrodes, and a UV laser. These lamps have an emission wavelength range within the above-described range and thus can be basically applied as long as the size of a power source, the incident light intensity, and the shape of a lamp are compatible. The light source can be selected according to the sensitivity of a polymerization initiator to be used.

The illuminance of the active energy rays according to the embodiment is set to be 1 W/cm$^2$ to 2 Wcm$^2$ in an effective wavelength range for curing. When the illuminance is less than 1 W cm$^2$ and too weak, cloudy unevenness in brilliance cannot be removed and a high-quality image having toughness cannot be obtained. When the illuminance is greater than 2 W cm$^2$ and too strong, cloudy unevenness in brilliance cannot be removed and furthermore a recording medium is damaged and color materials fade.

Ink Jet Recording Apparatus

Figure 2:
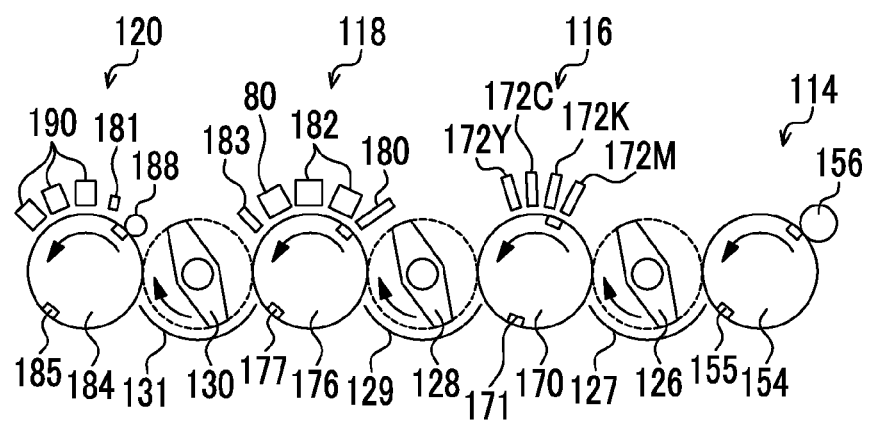
FIG. 2 is a diagram schematically illustrating major components of an ink jet recording apparatus which is used in an image forming method according to an embodiment of the present disclosure.

Next, a preferable example of an ink jet recording apparatus, which forms an image with the image forming method according to the embodiment, will be described in detail with reference to FIGS. 1 and 2. FIG. 1 is a diagram schematically illustrating the entire configuration of the ink jet recording apparatus. FIG. 2 is a diagram schematically illustrating major components of the ink jet recording apparatus.

FIG. 1 is a diagram schematically illustrating the entire configuration of an ink jet recording apparatus which forms an image with an image forming method according to an embodiment of the present disclosure.

Such an ink jet recording apparatus 100 is an impression cylinder direct-drawing type inkjet recording apparatus in which multiple colors of water-based UV curable inks are discharged from ink jet heads 172M, 172K, 172C, and 172Y onto a recording surface of a recording medium P, which is held by an impression cylinder (image forming drum 170) of an image forming unit 116 to form a desired color image. In addition, the ink jet recording apparatus 100 is an on-demand type image forming apparatus which adopts a two-liquid reaction (aggregation) method in which the treatment solution (the liquid composition containing the aggregation component capable of aggregating components in the ink composition) is applied onto the recording medium P before applying ink; and the treatment solution and the ink solution are caused to react with each other to form an image on the recording medium P.

That is, as illustrated in FIG. 1, the ink jet recording apparatus 100 mainly includes a sheet feeding unit 112, a treatment solution applying unit 114, the image forming unit 116, a drying unit 118, an irradiation unit 120, and a sheet discharge unit 122.

The sheet feeding unit 112 is a mechanism which supplies the recording medium P to the treatment solution applying unit 114. The recording media P, which are cut sheets of paper, are laminated on the sheet feeding unit 112. The sheet feeding unit 112 is provided with a sheet feeding tray 150 and the recording media P are fed from this sheet feeding tray 150 to the treatment solution applying unit 114 one by one. In order to prevent the recording media P from lifting from the sheet feeding tray 150, the sheet feeding tray 150 is provided with suction holes on an outer surface thereof and is connected to suction means for applying a negative pressure to suction the recording media P through the suction holes.

In addition, a sheet moisture meter 113, which measures the water content of a recording surface of the fed recording medium P, is provided in the sheet feeding unit 112. The sheet moisture meter 113 measures a water content which is included in the fed recording medium P in the first place. Furthermore, as will be described below, a difference between this water content and a water content of the recording medium P, which is measured with a sheet moisture meter 181 when fixing is performed with ultraviolet rays, can be calculated. In this case, the sheet moisture meter 181 is provided inside the irradiation unit 120.

The ink jet recording apparatus 100 according to the embodiment can use plural kinds of recording media P having different kinds and different sizes (paper size). The sheet feeding unit 112 is provided with plural sheet trays (not illustrated) in which plural kinds of recording media are respectively classified and piled up. A configuration can be adopted in which the plural sheet trays automatically switch to feed sheets to the sheet feeding tray 150. As necessary, the operator can select a sheet tray or switch between the plural sheet trays. In the embodiment, cut paper is used as the recording medium P. However, a configuration can be adopted in which continuous paper (roll paper) is cut to a necessary size to be fed.

The treatment solution applying unit 114 is a mechanism in which the treatment solution is applied onto a recording surface of the recording medium P. The treatment solution contains the aggregation component capable of aggregating components in the ink composition which is applied by the ink forming unit 116. When the treatment solution and the ink are in contact with each other, an aggregation reaction with the ink is caused and the separation between color materials and a solvent is promoted. As a result, bleeding after the ink application, application interference (coalescence), or color mixing does not occur and a high-quality image can be formed. Optionally, the treatment solution can further contain other components in addition to the aggregation component. By using both the ink composition and the treatment solution, high-speed ink jet recording can be performed; and even when high-speed recording is performed, an image having superior image forming properties such as density or resolution (for example, the reproduction of thin lines and fine portions) can be obtained.

As illustrated in FIG. 1, the treatment solution applying unit 114 includes a sheet feeding cylinder 152, a treatment solution drum 154, and a treatment solution applying device 156. The treatment solution drum 154 is a drum which holds the recording medium P to be rotated and transported. The treatment solution drum 154 includes claw-shaped holding means (gripper) on an outer peripheral surface thereof. The recording medium P is interposed between a claw of the holding means 155 and the peripheral surface of the treatment solution drum 154 and thus the leading end of the recording medium P can be held. The treatment solution drum 154 may be provided with suction holes on the outer peripheral surface thereof and may be connected to suction means for suctioning the recording medium P through the suction holes with a negative pressure. As a result, the recording medium P can be brought into close contact with and held on the peripheral surface of the treatment solution drum 154.

The treatment solution applying device 156 is provided on the outer side of the treatment solution drum 154 so as to face the peripheral surface thereof. The treatment solution applying device 156 applies the treatment solution onto a recording surface of the recording medium P.

The recording medium P, onto which the treatment solution is applied by the treatment solution applying unit 114, is transported from the treatment solution drum 154 to the image forming drum 170 of the image forming unit 116 through an intermediate transport unit 126 (first cylindrical transport means).

The image forming unit 116 includes the image forming drum 170 and the ink jet heads 172M, 172K, 172C, and 172Y. Although not illustrated in FIG. 1, a sheet pressing roller for removing wrinkles of the recording medium P may be arranged on the front side of the ink jet heads 172M, 172K, 172C, and 172Y with respect to the image forming drum 170.

Similarly to the case of the treatment solution drum 154, the image forming drum 170 includes claw-shaped holding means (gripper) 171 on an outer peripheral surface thereof such that the leading end of the recording medium is held and fixed. In addition, the image forming drum 170 has plural suction holes on the outer peripheral surface thereof and thus the recording medium P is suctioned by a negative pressure on the outer peripheral surface of the image forming drum 170. As a result, the contact between the recording medium P and the ink jet heads 172, which may be caused by sheet lifting, is avoided and sheet jamming is prevented. Furthermore, unevenness of an image, which may be caused by changes in the clearance between the recording medium P and the ink jet heads 172, is prevented.

The recording medium P, which is fixed to the image forming drum 170 in this way, is transported such that a recording surface thereof faces outside. The ink composition according to the embodiment is applied onto this recording surface from the ink jet heads 172M, 172K, 172C, and 172Y.

Each of the ink jet heads 172M, 172K, 172C, and 172Y is a full-line type ink jet recording head (ink jet head) which has a length corresponding to the maximum width of an image forming region in the recording medium P. A nozzle array, in which plural ink discharge nozzles are arranged over the entire width of the image forming region, is formed on an ink discharge surface of each of the ink jet heads 172. Each of the ink jet heads 172M, 172K, 172C, and 172Y extends in a direction perpendicular to a transport direction (rotating direction of the image forming drum 170) of the recording medium P.

The ink droplets of the corresponding color are discharged from each of the ink jet heads 172M, 172K, 172C, and 172Y onto the recording surface of the recording medium P which is in close contact with and held on the image forming drum 170. As a result, the ink is brought into contact with the treatment solution, which is applied in advance onto the recording surface by the treatment solution applying unit 114; and color materials (pigments), dispersed in the ink, aggregate to form color material aggregates. Accordingly, the color materials are prevented from flowing on the recording medium P and an image is formed on the recording surface of the recording medium P.

In the embodiment, a configuration using the standard colors (four colors) of CMYK is described as an example. However, the combinations for the color of ink and the number of colors are not limited to this configuration. As necessary, light ink, dark ink, or special color ink may be added. For example, a configuration can be adopted in which an ink jet head for discharging a light ink such as light cyan or light magenta ink is added, and the arrangement order of the respective color heads is not particularly limited.

The image forming unit 116 configured as above can form an image on the recording medium P with a single-pass method. As a result, high-speed recording and high-speed printing can be performed and the productivity can increase.

The recording medium P, on which an image is formed by the image forming unit 116, is transported from the image forming drum 170 to a drying drum 176 of the drying unit 118 through an intermediate transport unit 128 (second cylindrical transport means).

The drying unit 118 is a mechanism of drying water in a solvent, which is separated by the color material aggregation action. As illustrated in FIG. 1, the drying unit 118 includes the drying drum 176 and a solvent drying device 178. Similarly to the case of the treatment solution drum 154, the drying drum 176 includes claw-shaped holding means (gripper) 177 on an outer peripheral surface thereof. This holding means 177 holds the leading end of the recording medium P, and suction holes (not illustrated) are provided on the outer peripheral surface of the drum. Accordingly the drying drum 176 can suction the recording medium P with a negative pressure. In addition, blowing means 180 (suction assisting means) and the solvent drying device 178 are provided so as to face the outer peripheral surface of the drying drum 176.

The blowing means 180 assists the suction of the recording medium P to the drying drum 176. The blowing means 180 obliquely blows air toward an end side in a width direction of the recording medium P. As a result, the recording medium P, of which the leading end is held by the holding means 177, is reliably suctioned from the leading end side to the trailing end side without wrinkles.

The solvent drying device 178 is arranged at a position facing the outer peripheral surface of the drying drum 176; and includes hot air drying means 182 in which plural combinations of an IR heater or the like and a fan are arranged. Various drying conditions can be realized by appropriately adjusting the temperature and volume of hot air which blows from the respective hot air blowing nozzles of the hot air blowing means 182 toward the recording medium P. The recording medium P is transported while being suctioned on and fixed to the outer peripheral surface of the drying drum 176 such that the recording surface thereof faces outside. This recording surface is dried by the above-described IR heater and the hot air blowing nozzles.

In addition, the drying drum 176 is provided with suction holes at an outer peripheral surface thereof and includes suction means for performing suction through the suction holes with a negative pressure. As a result, the recording medium P can be in close contact with and held on the outer peripheral surface of the drying drum 176. In addition, the recording medium P can be fixed to the drying drum 176 by performing suction with a negative pressure and thus the cockling of the recording medium P can be prevented.

The recording medium P which is dried by the drying portion 118 is transported from the drying drum 176 to a fixing drum 184 of the irradiation unit 120 through an intermediate transport portion 130 (third cylindrical transport means).

The irradiation unit 120 includes the fixing drum 184, a pressing roller 188 (smoothing means) and an ultraviolet ray source 190 (active energy ray irradiating means). Similarly to the case of the treatment solution drum 154, the fixing drum 184 includes claw-shaped holding means (gripper) 185 on an outer peripheral surface thereof. The leading end of the recording medium P is held by this holding means 185.

Due to the rotation of the fixing drum 184, the recording medium P is transported such that the recording surface thereof faces outside. This recording surface is smoothed by the pressing roller 188 and is cured and fixed by being irradiated with ultraviolet rays from the ultraviolet ray source 190.

The pressing roller 188 presses the recording medium P, on which ink is dried, to smooth the recording medium P. In addition, the ultraviolet ray source 190 irradiates an image, which is formed of a water-based UV curable ink discharged on the recording medium P, with ultraviolet rays to fix the ink.

An inline sensor for inspecting an image formed on the recording medium P may be provided so as to face the outer peripheral surface of the fixing drum 184. The inline sensor is measurement means for measuring the check pattern, water content, surface temperature, degree of brilliancy, and the like of an image fixed on the recording medium P. For example, a CCD line sensor can be preferably used.

The sheet discharge unit 122 is provided next to the irradiation unit 120. The sheet discharge unit 122 is provided with a sheet discharge unit 192. A transport cylinder 194 and a transport chain 196 are provided between the fixing drum 184 of the irradiation unit 120 and the sheet discharge unit 192. The transport chain 196 is wound around a tension roller 198. The recording medium P, which has passed through the fixing drum 184, is transported to the transport chain 196 through the transport cylinder 194 and then is transported from the transport chain 196 to the sheet discharge unit 192.

In addition, although not illustrated in FIG. 1, the ink jet recording apparatus 100 according to the embodiment includes, in addition to the above-described configuration, an ink storage and filling portion which supplies ink to the respective ink jet heads 172M, 172K, 172C, and 172Y; and means for supplying the treatment solution to the treatment solution applying unit 114. Furthermore, the ink jet recording apparatus 100 also includes a maintenance portion which performs the cleaning (for example, wiping of nozzle surfaces, purging, or suctioning of nozzles) of the respective ink jet heads 172M, 172K, 172C, and 172Y; a position detection sensor which detects the position of the recording medium P on a sheet transport path; and a temperature sensor which detects the temperatures of the respective devices.

FIG. 2 illustrates, in an enlarged manner, the treatment solution applying unit 114, the image forming portion 116, the drying portion 118, and the irradiation unit 120 which are major components of the ink jet recording apparatus 100 according to the embodiment. Next, the drying portion 118 will be described in detail.

As illustrated in FIG. 2, as the major components of the ink jet recording apparatus, the treatment solution drum 154, the intermediate transport portion 126 (first cylindrical transport means), the image forming portion 170, the intermediate transport portion 128 (second cylindrical transport means), the drying drum 176, the intermediate transport portion 130 (third cylindrical transport means), and the fixing drum 184 are arranged in parallel. The recording medium P is transported by the respective drums. While the recording medium P is transported, the application of the treatment solution (liquid composition), image forming, drying, and irradiating (curing) are sequentially performed.

The intermediate transport portions (intermediate transport portions 126, 128, and 130) include rib-attached guide members 127, 129, and 131, respectively. A holding claw (not illustrated) at the tip of an arm, which extends in directions opposite to each other centering on a rotation axis by 180 degrees, holds the leading end of the recording medium P and rotates about the rotation axis. The trailing end of the recording medium P is in the free state and the recording medium P is transported along the respective guide members (127, 129, and 131) such that a back surface side opposite the recording surface is convex.

The recording medium P, on which an image is formed by the image forming portion 116, is transported from the image forming drum 170 to the drying drum 176 of the drying portion 118 through the intermediate transport portion (second cylindrical transport means) 128. The intermediate transport portion 128 holds the leading end of the recording medium P, which is transported from the image forming drum 170, with the holding claw (not illustrated) and transports the recording medium P such that the recording surface of the recording medium P faces inside and the back surface thereof has a convex shape along with the guide member 129.

The intermediate transport portion 128 may include hot air drying means (drying means; not illustrated) therein such that hot air blows toward the recording surface of the recording medium P, which faces inside during transport, to dry the ink applied onto the surface. As a result, the ink can be dried immediately after the application of ink. Therefore, the cockling of the recording medium P, which may be caused by ink permeation, can be reduced; and the wrinkles of the recording medium P can be suppressed when the recording medium P is suctioned and fixed to the drying drum 176 of the drying portion 118.

The drying portion 118 is a mechanism which dries the solvent, in particular, water separated by the color material aggregation reaction. The hot air drying means 182, in which plural combinations of an IR heater or the like and a fan is provided at the position of the drying drum 176 and a position opposite the outer peripheral surface of the drying drum 176.

In addition, the blowing means 180 (suction assisting means) is provided upstream of the plural hot air drying means 182 (in the rotating direction of the drying drum 176) so as to face the outer peripheral surface of the drying drum 176. Furthermore, humidity control means 80 for controlling the humidity in the drying portion 118; and a humidity sensor (not illustrated) are provided Similarly to the case of the treatment solution drum 154, the drying drum 176 includes claw-shaped holding means (gripper) 177 on an outer peripheral surface thereof, and the leading end of the recording medium P is held by this holding means 177. In addition, the drying drum 176 includes plural suction holes on the outer peripheral surface thereof. The recording medium P is fixed and transported while being suctioned to and is in close contact with the outer peripheral surface of the drying drum 176. Then, hot air blows from the hot air blowing nozzles of the hot air drying means 182 toward the recording medium P, which is fixed to the drying drum 176 as described above, and thus the recording medium P is dried.

As a result, the cockling of the recording medium P is prevented. In addition, by bringing the recording medium P into close contact with the outer peripheral surface of the drying drum 176, sheet jamming or sheet burning, which may be caused by the contact between the hot air drying means 182 and the recording medium P, can be prevented.

The hot air blowing nozzles of the hot air drying means 182 are configured to blow hot air with a predetermined control temperature and a predetermined volume toward the recording medium P. The IR heaters are respectively controlled to be at predetermined temperatures. Due to the hot air blowing nozzles and the IR heaters, water, which is included in the recording surface of the recording medium P held by the drying drum 176, is evaporated and dried. At this time, since the drying drum 176 of the drying portion 118 is separated from the image forming drum 170 of the image forming portion 116, cases where ink is not discharged by a head meniscus portion being dried by heat in the ink jet heads 172M, 172K, 172C, and 172Y, can be reduced. In addition, the drying portion 118 has degrees of freedom for temperature setting and can set the drying temperature to be optimum.

It is preferable that the evaporated water be discharged outside the apparatus by discharge means (not illustrated) along with air. In addition, the recovered air may be cooled by a cooler (radiator) to be recovered as liquid.

In addition, it is preferable that the outer peripheral surface of the drying drum 176 be controlled to have a predetermined temperature. By heating the back surface of the recording medium P, drying is promoted and an image is prevented from being damaged during image fixing.

The surface temperature range of the drying drum 176 is preferably higher than or equal to 50° C. and more preferably higher than or equal to 60° C. In addition, the upper limit is not particularly limited, and is preferably less than or equal to 75° C. from the viewpoint of the safety (the prevention of a burn at high temperature) of maintenance works such as cleaning ink attached onto the surface of the drying drum 176.

In addition, it is preferable that the drying drum 176 be heated at a predetermined temperature before the recording medium P is transported. By heating the drying drum 176, drying is promoted. Therefore, an image can be prevented from being damaged and the cockling can be prevented. It is preferable that the heating temperature be within the same temperature range as that of the surface temperature of the drying drum 176.

Since heating prevents the temperature of the recording medium P from being lowered when the recording medium P is suctioned, it is preferable that the recording medium P be heated at a predetermined temperature while being suctioned. In addition, when the recording medium P is heated while not being suctioned, it is preferable that heating be performed at a higher temperature than the predetermined temperature in consideration of the temperature drop during suctioning. In addition, the recording medium P is held such that the recording surface thereof faces outside (that is, in a state where the recording surface of the recording medium P is curved to be convex) and the recording medium P is dried while being rotated and transported. As a result, the wrinkles and lifting of the recording medium P can be prevented and drying unevenness, caused by the wrinkles and lifting, can be reliably prevented.

In addition, the blowing means 180 (suction assisting means), which is provided upstream of the hot air drying means 182, assists the suction of the recording medium P to the drying drum 176. The drying means 180 obliquely blows air toward the trailing end of the recording medium P; obliquely blows air toward an end portion in the width direction of the recording medium P; and controls air such that the wind force is greater toward the trailing end. As a result, the trailing end of the recording medium P is prevented from lifting, the wrinkles of the recording medium P can be removed, and drying and suctioning can be uniformly performed. By using the blowing means 180, which is the suction assisting means not being in contact with the recording medium P, a case can be prevented in which, when means in contact with the recording medium P is used to assist the suction, undried ink on the recording medium P is transferred onto the means and image defects are generated.

The suction force of the drying drum 176 can be represented by an expression of (opening area)×(pressure per unit area). The suction force can be further improved by increasing the surface area of suction holes in a region where the recording medium is suctioned and held, that is, by increasing the aperture ratio.

In addition, it is preferable that the aperture ratio of the suction holes, which are provided on the outer peripheral surface of the drying drum 176, be 1% to 75% with respect to the area of contact between the outer peripheral surface of the drying drum 176 and the recording medium P. When the aperture ratio is less than 1%, the expansion deformation of the recording medium P, caused by water absorption after recording, cannot be sufficiently suppressed. In addition, since the drying drum 176 also is warm, drying is promoted by the recording medium P coming into contact with the drying drum 176. However, when the aperture ratio is greater than 75%, the area of contact between the back surface of the recording medium P and the outer peripheral surface of the drying drum 176 is reduced. Therefore, even when the recording medium P is suctioned and held, there is a concern that sufficient drying performance cannot be obtained and the cockling becomes severe.

Therefore, when the aperture ratio of the suction holes on the outer peripheral surface of the drying drum 176 is 1% to 75%, the cockling is suppressed and drying performance is improved.

The aperture ratio is set by the diameter of the suction holes, the hole pitch, and the shape and arrangement of the holes. It is preferable that the hole diameter be greater than or equal to 0.4 mm and less than or equal to 1.5 mm from the viewpoints that concave marks (suction marks) due to suction with a negative pressure do not remain on the recording medium P. It is preferable that the hole pitch be 0.1 to 5 mm from the viewpoints of preventing the thermal deformation of the outer peripheral surface of the drying drum 176 and securing rigidity. This is because a deformation prevention effect for the recording medium is insufficient and wrinkles cannot be sufficiently suppressed when the gap between the holes is too large. In addition, when the shape of the suction holes is an angular shape (acute-angular shape), the stress is concentrated on the angular portion, and thus it is preferable that the angular portion be rounded.

In addition, in the drying drum 176, the deformation amount of the recording medium P due to a suction pressure is larger in an axis direction thereof than in a peripheral direction thereof. Therefore, when the suction holes have an elliptical shape or a long hole shape in which the peripheral direction is a long axis direction and the axial direction is a short axis direction, the deformations of the recording medium P in the peripheral direction of the drying drum 176 and in the axis direction thereof can be made the same.

In addition, the recording medium P is held on the outer peripheral surface of the drying drum 176 such that the recording surface of the recording medium P faces outside (that is, in a state the recording surface of the recording medium P is curved to be convex); and is dried while being rotated and transported. As a result, the wrinkles and floating of the recording medium P can be prevented and drying unevenness, caused by the wrinkles and floating, can be reliably prevented.

The humidity can be controlled by controlling drying conditions with the hot air drying means 182. However, in the embodiment, the humidity control means 80 for controlling the humidity is provided inside the drying portion 118. The humidity control means 80 controls the humidity such that the water content (described below) in the recording medium P falls within a desired range; such that the recording medium P in the drying portion 118 is not overdried; and such that the water content is not excessively large.

Specifically, humidifying means and drying means may be combined to configure the humidity control means 80. The humidifying means and the drying means are not particularly limited. For example, a steam-type, fan-type, or ultrasonic humidifier, which is generally used, may be used to configure the humidifying means; and an electric heating drier may be used as the drying means.

In addition, the sheet moisture meter 181, which measures the water content of an image cured with active energy rays and the water content of a non-image portion, is provided inside the irradiation unit 120. The residual water content ($W_0$) of a non-image portion on the recording medium P is a value obtained by subtracting the water content, removed in the drying step, from the total sum of the water content included in the recording medium P in the first place and the water content in the treatment solution applied by the treatment solution applying unit 114. The ink droplets are applied from the ink jet heads 172 onto the recording medium, onto which the treatment solution is applied, by the image forming portion 116. The water content included in the ink droplets after drying is further added to the above-described water content. As a result, the water content of an image on the recording medium P is determined.

EXAMPLES

Hereinafter, the embodiment will be described in further detail with reference to Examples. The embodiment is not limited to the following examples within a range not departing from the concepts thereof. "%" and "part" represents "% by mass" and "part by mass" unless specified otherwise.

Preparation of Polymer Dispersant 1 Solution 6 parts of styrene, 11 parts of stearyl methacrylate, 4 parts of STYRENE MACROMER AS-6 (manufactured by Toagosei Co., Ltd.), 5 parts of BLEMMER PP-500 (manufactured by NOF Corporation), 5 parts of methacrylic acid, 0.05 parts of 2-mercaptoethanol, and 24 parts of methyl ethyl ketone were added to a reaction vessel to prepare a mixed solution. Meanwhile, 14 parts of styrene, 24 parts of stearyl methacrylate, 9 parts of STYRENE MACROMER AS-6 (manufactured by Toagosei Co., Ltd.), 9 parts of BLEMMER PP-500 (manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added to a dropping funnel to prepare a mixed solution.

Then, the mixed solution in the reaction vessel was heated at 75° C. while stirring the mixed solution in a nitrogen atmosphere, and the mixed solution in the dropping funnel was gradually added dropwise thereto for 1 hour. After 2 hours from the completion of dropwise addition, a solution, obtained by dissolving 1.2 parts of 2,2'-azobis(2,4-dimethylvaleronitrile) in 12 parts of methyl ethyl ketone, was added dropwise thereto for 3 hours, followed by being left to stand at 75° C. for 2 hours and at 80° C. for 2 hours. As a result, a polymer dispersant 1 solution was obtained.

A solid content was separated by removing a solvent from a part of the polymer dispersant 1 solution. The obtained solid content was diluted to 0.1% by mass with tetrahydrofuran. Three of TSKgeL Super HZM-H, TSKgeL Super HZ4000, and TSKgeL Super HZ2000 were connected in series to measure the weight average molecular weight with high-speed gel permeation chromatography (GPC) equipment HLC-8220GPC (manufactured by Tosoh Corporation). The measured weight average molecular weight was 25,000 in terms of polystyrene. The acid value of the polymer was 99 mgKOH/g calculated by a method according to JIS standard (JIS K0070:1992).

Preparation of Pigment Dispersion M 5.0 g (in terms of solid content) of the obtained polymer dispersant 1 solution, 10.0 g of magenta pigment (Pigment Red 122, manufactured by Dainichiseika Color and Chemicals Mfg. Co., Ltd.), 40.0 g of methyl ethyl ketone, 8.0 g of 1 mol/L (liter; hereinafter, the same shall be applied) sodium hydroxide aqueous solution, and 82.0 g of ion exchange water were supplied to a vessel with 300 g of 0.1 mm zirconia beads, followed by dispersion with a ready mill disperser (manufactured by Aimex Co., Ltd.) at 1000 rpm for 6 hours. The obtained dispersion was concentrated under reduced pressure until methyl ethyl ketone was sufficiently removed by distillation, and was further concentrated until the concentration of the pigment was 10% by mass. As a result, a pigment dispersion M of a resin-coated magenta pigment was prepared.

Preparation of Pigment Dispersion Y

A pigment dispersion Y of a resin-coated yellow pigment was obtained with the same preparation method of the pigment dispersion M, except that Irgalite Yellow GS (Pigment Yellow 74, manufactured by BASF Japan Ltd.) was used as the pigment instead of Pigment Red 122.

Preparation of Pigment Dispersion C

CABO-JET250C (Pigment Blue 15:4 (PB15:4); cyan pigment dispersion manufactured by Cabot Corporation) was prepared as a pigment dispersion C. The pigment dispersion C is a pigment dispersion of a resin-coated cyan pigment in which PB15:4 is coated with a resin.

Preparation of Pigment Dispersion K

A pigment dispersion K (black ink) was obtained with the same preparation method of the pigment dispersion M, except that carbon black (MA-100, manufactured by Mitsubishi Chemical Corporation) was used as the pigment instead of Pigment Red 122.

Synthesis of Specific Monomer (C)

First Step

To a 1 L three-necked flask equipped with a stirrer bar, 121 g (1 equivalent) of tris(hydroxymethyl)aminomethane (manufactured by Tokyo Chemical Industry Co., Ltd.), 84 ml of 50% by mass of potassium hydroxide aqueous solution, and 423 ml of toluene were added, followed by stirring. 397.5 g (7.5 equivalents) of acrylonitrile was added dropwise to the reaction system for 2 hours in a water bath while maintaining the reaction system at 20° C. to 25° C. After the dropwise addition, the obtained solution was stirred for 1.5 hours. Then, 540 ml of toluene was added to the reaction system and the reaction mixture thereof was moved to a separatory funnel to remove the water layer. The remaining organic layer was dried with magnesium sulfate, followed by celite filtration, and the solvent was removed from the obtained filtrate under reduced pressure. As a result, an acrylonitrile adduct was obtained. The obtained material showed the same satisfactory results as well-known materials according to analysis of $^1$H-NMR and MS; and thus was used for the next reduction reaction without further refinement.

Second Step

To a 1 L autoclave, 24 g of the obtained acrylonitrile adduct, 48 g of Ni catalyst (Raney Nickel 2400, manufactured by W. R. Grace & Co. Inc.) and 600 ml of 25% by mass of ammonia aqueous solution (water:methanol=1:1) were added, followed by suspension. Then, the reaction vessel was sealed. Ten (10) Mpa of hydrogen was introduced into the reaction vessel, followed by the reaction at a reaction temperature of 25° C. for 16 hours.

After confirming the disappearance of raw materials with $^1$H-NMR, the reaction mixture was filtered with celite and celite was washed with methanol multiple times. The solvent was removed by distillation from the filtrate to obtain a polyamine compound. The obtained material was used for the next reaction without further refinement.

Third Step

To a 2 L three-necked flask equipped with a stirrer, 30 g of the obtained polyamine compound, 120 g (14 equivalents) of NaHCO$_3$, 1 L of dichloromethane, and 50 ml of water were added, followed by mixing. To the mixture, 92.8 g (10 equivalents) of acrylic acid chloride was added dropwise for 3 hours in an ice bath. Then, the obtained solution was stirred at room temperature for 3 hours. After confirming the disappearance of raw materials with $^1$H-NMR, the solvent was removed from the reaction mixture under reduced pressure. Next, the reaction mixture was dried with magnesium sulfate, followed by celite filtration, and the solvent was removed from the obtained filtrate under reduced pressure. Finally, the resultant was refined with column chromatography (ethyl acetate: methanol=4:1). As a result, a solid polyvalent (meth)acrylamide B-1 was obtained at room temperature. The yield of a specific monomer (C) (having the following structure), obtained through the above-described three steps, was 40% by mass.

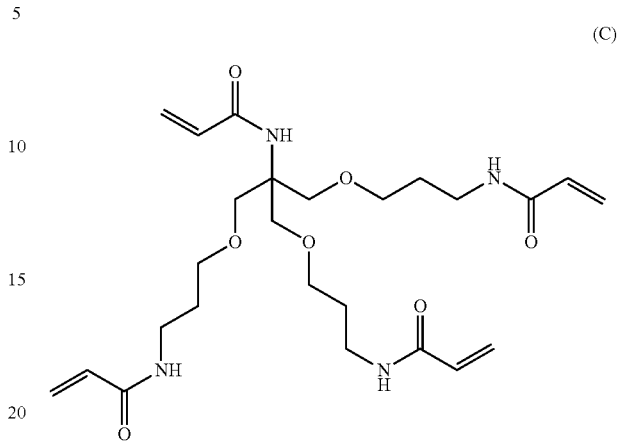

Synthesis of Specific Monomers A and B

Specific monomers (A) and (B) were synthesized in accordance with the synthesis order of the above-described specific monomer (C).

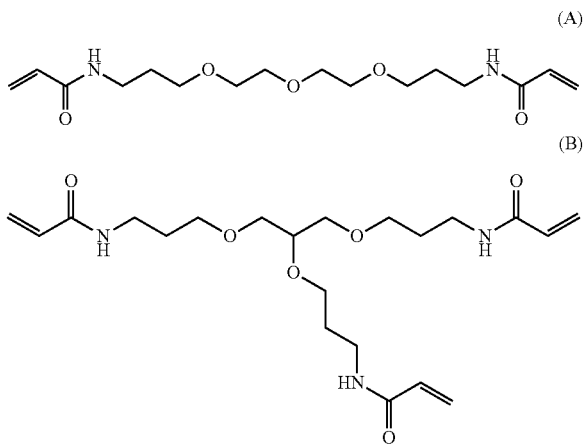

In addition, monomers (D) and (E) having the following structures were used as comparative polymerizable compounds. In the monomer (E), m represents 9. The monomer (D) is hydroxyethyl acrylamide (manufactured by Kohjin co., Ltd.), and the monomer (E) is A-400 (manufactured by Shin-Nakamura Chemical Co., Ltd.).

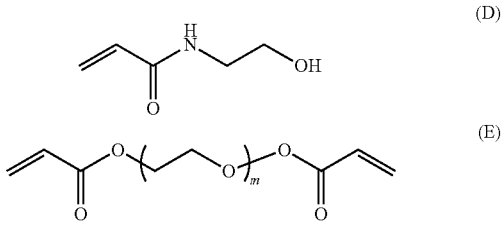

Preparation of Self-Dispersible Polymer Particles P-1

Into a 2 L three-necked flask equipped with a stirrer, a thermometer, a reflux condenser, and a nitrogen gas introducing tube, 360.0 g of methyl ethyl ketone was put, followed by heating at 75° C. Then, a mixed solution, obtained by mixing 180.0 g of phenoxy ethyl acrylate, 162.0 g of methyl methacrylate, 18.0 g of acrylic acid, 72 g of methyl ethyl ketone, and 1.44 g of "V-601" (manufactured by Wako Pure Chemical Industries Ltd., dimethyl 2,2'-azobis(2-methylpropionate)) with each other, was added dropwise thereto at a constant speed such that the addition was completed after 2 hours, while maintaining the temperature in the flask at 75° C. After the dropwise addition, a mixed solution of 0.72 g of "V-601" and 36.0 g of methyl ethyl ketone were added thereto, followed by stirring at 75° C. for 2 hours. Furthermore, a mixed solution of 0.72 g of "V-601" and 36.0 g of isopropanol were added thereto, followed by stirring at 75° C. for 2 hours. Then, the temperature was raised to 85° C. and stirring was continued for 2 hours. As a result, a resin solution of a phenoxy ethyl acrylate/methyl methacrylate/acrylic acid (=50/45/5 in terms of mass ratio) copolymer was obtained.

The weight average molecular weight (Mw) of the obtained copolymer was 64,000 when measured in the same manner as that of the polymer dispersant 1 solution (gel permeation chromatography (GPC); in terms of polystyrene), and the acid value thereof was 38.9 mgKOH/g.

Next, 668.3 g of the obtained resin solution was weighed, 388.3 g of isopropanol and 145.7 ml of 1 mol/L NaOH aqueous solution were added thereto and the temperature in the reaction vessel was raised to 80° C. Next, 720.1 g of distilled water was added dropwise to the heated solution at a rate of 20 ml/min, followed by water dispersion. The resultant was left to stand under atmospheric pressure at temperatures in the reaction vessel of 80° C. for 2 hours, at 85° C. for 2 hours, and at 90° C. for 2 hours. The pressure in the reaction vessel was reduced and 913.7 g in total of isopropanol, methyl ethyl ketone, and distilled water was removed by distillation. As a result, an aqueous dispersion P-1 of 28.0% by mass (in terms of solid concentration) of self-dispersible polymer particles was obtained.

Preparation of Ink Composition

The following composition of components were mixed and coarse particles were removed by filtration through a membrane filter (pore size: 5 μm). As a result, ink compositions 1 to 9 and comparative ink compositions 101 to 105 were prepared. Symbol "-" in Table 1 represents that the component in the corresponding item is not included.

Composition of Ink Compositions

| Polymerizable Composition | |
|---|---|
| Compound shown in Table 1 (one of (A) to (E)) | Amount (%) shown in Table 1 |
| Pigment Dispersion | |
| One of pigment dispersions K, M, Y, and C shown in Table 1 | 6 (%) |
| Self-dispersible polymer particles P-1 | Amount (%) shown in Table 1 |
| Polymerization Initiator | |
| IRGACURE 2959 (manufactured by BASF Japan Ltd.) | 3 (%) |
| Surfactant | |
| Olfin E1010 (manufactured by Nissin Chemical. Industry Co., Ltd.) | 1 (%) |
| Water | Balance with respect to the total amount of 100 (%) |

Preparation of Treatment Solution 1 (Liquid Composition)

The following composition of components were mixed to prepare a treatment solution 1. The pH (25° C.) of the treatment solution 1 was 1.02. The pH was measured with a pH meter WM-50EG (manufactured by DKK-Toa Corporation) while maintaining the temperature at 25° C.

| Composition | |
|---|---|
| Malonic acid (manufactured by Wako Pure Chemical Industries Ltd.) | 25% |
| Diethylene glycol monomethyl ether (manufactured by Wako Pure Chemical Industries Ltd.) | 20% |
| Emulgen P109 (manufactured by Kao Corporation, nonionic surfactant) | 1% |
| Ion exchange water | Balance with respect to the total amount of 100 (%) |

Image Formation and Evaluation

1. Image Formation

OK TOPCOAT+(coated paper, manufactured by Oji Paper Co., Ltd.) was used as a recording medium P.

First, by using the ink jet recording apparatus shown in FIG. 1 in which the treatment solution applying unit 114 was filled with the treatment solution 1, the corresponding color inks were discharged from the ink jet heads 172M, 172K, 172C, and 172Y to form a solid image and a 1200 dpi line image on the recording medium.

Each head is a 1200 dpi/10 inch width full-line head (drive frequency: 25 kHz, transport speed of recording medium: 500 mm/s); and can discharge the color ink with a single-pass method to form an image.

The amount of the treatment solution applied onto the recording medium was 1.5 ml/m$^2$.

In addition, when the images were formed, each color ink was discharged from each of the discharge heads under conditions of a resolution of 1200 dpi×1200 dpi, an amount of ink droplets of 2.5 μl to 3.6 μl, and a maximum application amount of ink of 11 ml/m$^2$. The solid image was formed by discharging the color inks onto the entire surface of a sample which was obtained by cutting the recording medium into A5 size.

Specifically, the images were formed under the following conditions.

First, the treatment solution 1 was applied onto the recording medium with a single-pass method, and the treatment solution 1 was dried. At this time, the recording medium passed through the drying portion within 900 msec after starting the application of the treatment solution. The recording medium was dried with a method in which the applied treatment solution was dried by heating a back surface opposite the applied surface (recording surface) with a infrared heater at a film surface temperature of 40 to 45° C.; and by blowing hot air toward the recording surface with a blower for 5 seconds at 120° C. and 5 m/sec.

Next, the color inks were discharged onto the recording medium with a single-pass method to form the images.

Then, the image on the recording medium was dried by the drying portion 118 until the film surface temperature was the temperature shown in Table 1. The transport rate was adjusted such that the time, taken from when the respective color ink droplets were applied onto the recording medium to when the recording medium is transported to the drying portion 118 and drying starts, was 800 msec. At this time, the transport rate of the recording medium was as shown in Table 1.

The image was dried by causing a sheet transport stage to pass through the inside of a climate-controlled chamber. In addition, the film surface temperature of the image and the residual water content were controlled according to the temperature and humidity in the climate-controlled chamber and the time for which the stage passes. The residual water content was measured with a Karl-Fischer moisture meter.

The difference ΔW between the residual water contents, which was obtained with the above-described method, was shown in Table 1.

After the images were dried, the images were irradiated with an UV lamp (metal halide lamp, manufactured by Eye Graphics Co., Ltd., maximum irradiation wavelength: 365 nm) while controlling the light source electric power and the transport rate (integrated irradiation amount: 0.75 J/cm$^2$).

2. Evaluation

The ink images, which were formed as described above, were evaluated with the following method.

The respective evaluation results were shown in Table 1.

1) Brilliance

A solid image sample having a 3 cm×3 cm square pattern was formed under conditions of an amount of ink droplets of 5.0 μl and a resolution of 1200 dpi×1200 dpi.

When the sample was visually inspected under fluorescent lamp light, the non-uniformity in the solid image surface of the sample was compared and evaluated for the "brilliance" such as brightness, glossiness, and sharpness of an image of the fluorescent lamp reflected on the sample. The scores (1: inferior to 5: superior) were marked as follows.

1: The non-uniformity of the brilliance was observed on the entire image pattern.

2: The non-uniformity of the brilliance was observed on 20% by area or higher of the image pattern.

3: The non-uniformity of the brilliance was observed on 1% by area to 5% by area of the image pattern at a peripheral portion.

4: The non-uniformity of the brilliance was observed on less than 1% by area of the image pattern at a peripheral portion.

5: The non-uniformity of the brilliance was not observed on the image surface.

2) Discharge Property

Ink droplets having a volume of 5.0 pL were discharged onto the recording medium to form an image having 5 mm-length linear pattern along with a transport direction of the recording medium such that the number of nozzles which discharges the ink droplets is countable.

With respect to a sample which was printed immediately after the heads were filled with the inks; and samples which were printed after the heads were filled with the inks and the apparatus was stopped to leave the heads to stand for a pre-determined time (1 minute to 60 minutes (For example, a sample being left to stand for 15 minutes.)) in an environment of a temperature of 25° C. and a relative humidity of 50%, the ratio R of the number of ink-discharged nozzles to the number of all the nozzles was obtained. The scores for the ratio R were marked as follows.

1: R<50% is satisfied for the sample printed after the head was left to stand for 0 minute.

2: R<50% is satisfied for the sample printed after the head was left to stand for 15 minutes.

3: R<50% is satisfied for the sample printed after the head was left to stand for 30 minutes.

4: R<50% is satisfied for the sample printed after the head was left to stand for 45 minutes.

5: R=100% is satisfied for the sample printed after the head was left to stand for 60 minutes.

TABLE 1

| | Ink composition | | | | | | | | | Drying Step | | | Evaluation Result | |
|---|---|---|---|---|---|---|---|---|---|---|---|---|---|---|
| | Pigment Dispersion (Pigment Solid Content) | | | | Polymer Particles Solid Content) | Polymerizable Compound | | | | Film Surface Temperature | Difference ΔW between Residual Water Content | Transport Rate of Recording Medium | Discharge Property | Brilliance |
| | No. | K | M | C | Y | | Kind | Number of Functional Groups | Amount (%) | Water | (° C.) | (g/m$^2$) | (mm/s) | — | — |
| Example 1 | 1 | 6 | — | — | — | 2 | A | 2 | 10 | Balance | 45 | 3 | 500 | 5 | 4 |
| Example 2 | 2 | 6 | — | — | — | 2 | B | 3 | 10 | Balance | 45 | 3 | 500 | 5 | 4.5 |
| Example 3 | 3 | 6 | — | — | — | 2 | C | 4 | 10 | Balance | 45 | 3 | 500 | 5 | 5 |
| Example 4 | 1 | 6 | — | — | — | 2 | A | 2 | 10 | Balance | 55 | 3 | 500 | 5 | 4 |
| Example 5 | 2 | 6 | — | — | — | 2 | B | 3 | 10 | Balance | 55 | 3 | 500 | 5 | 4.5 |
| Example 6 | 3 | 6 | — | — | — | 2 | C | 4 | 10 | Balance | 55 | 3 | 500 | 5 | 5 |
| Example 7 | 4 | 6 | — | — | — | 3 | C | 4 | 10 | Balance | 45 | 3 | 500 | 4 | 5 |
| Example 8 | 5 | 6 | — | — | — | 2 | C | 4 | 5 | Balance | 45 | 3 | 500 | 5 | 4 |
| Example 9 | 6 | 6 | — | — | — | 2 | C | 4 | 15 | Balance | 45 | 3 | 500 | 4 | 5 |
| Example 10 | 3 | 6 | — | — | — | 2 | C | 4 | 10 | Balance | 35 | 3 | 500 | 5 | 4 |
| Example 11 | 3 | 6 | — | — | — | 2 | C | 4 | 10 | Balance | 45 | 2 | 500 | 5 | 4 |
| Example 12 | 3 | 6 | — | — | — | 2 | C | 4 | 10 | Balance | 45 | 4 | 500 | 5 | 5 |
| Example 13 | 7 | — | 6 | — | — | 2 | C | 4 | 10 | Balance | 45 | 4 | 500 | 5 | 5 |
| Example 14 | 8 | — | — | 6 | — | 2 | C | 4 | 10 | Balance | 45 | 4 | 500 | 5 | 5 |
| Example 15 | 9 | — | — | — | 6 | 2 | C | 4 | 10 | Balance | 45 | 4 | 500 | 5 | 5 |
| Comparative Example 1 | 1 | 6 | — | — | — | 2 | A | 2 | 10 | Balance | 60 | 3 | 500 | 5 | 2 |
| Comparative Example 2 | 2 | 6 | — | — | — | 2 | B | 3 | 10 | Balance | 60 | 3 | 500 | 5 | 1 |
| Comparative Example 3 | 3 | 6 | — | — | — | 2 | C | 4 | 10 | Balance | 60 | 3 | 500 | 5 | 1 |
| Comparative Example 4 | 101 | 6 | — | — | — | 3.5 | C | 4 | 10 | Balance | 45 | 3 | 500 | 2 | 5 |
| Comparative Example 5 | 102 | 6 | — | — | — | 2 | C | 4 | 4.5 | Balance | 45 | 3 | 500 | 5 | 2 |
| Comparative Example 6 | 103 | 6 | — | — | — | 2 | C | 4 | 17 | Balance | 45 | 3 | 500 | 2 | 5 |
| Comparative Example 7 | 3 | 6 | — | — | — | 2 | C | 4 | 10 | Balance | 30 | 3 | 500 | 5 | 1 |
| Comparative Example 8 | 104 | 6 | — | — | — | 2 | D | 1 | 10 | Balance | 45 | 3 | 500 | 5 | 2 |

TABLE 1-continued

| | | Ink composition | | | | | | | | | Drying Step | | | Evaluation Result | |
|---|---|---|---|---|---|---|---|---|---|---|---|---|---|---|---|
| | | Pigment Dispersion (Pigment Solid Content) | | | | Polymer Particles Solid Content | Polymerizable Compound | | | | Film Surface Temperature | Difference ΔW between Residual Water Content | Transport Rate of Recording Medium | | |
| | No. | K | M | C | Y | | Kind | Number of Functional Groups | Amount (%) | Water | (° C.) | (g/m²) | (mm/s) | Discharge Property | Brilliance |
| Comparative Example 9 | 105 | 6 | — | — | — | 2 | E | 2 | 10 | Balance | 45 | 3 | 500 | 5 | 1 |
| Comparative Example 10 | 3 | 6 | — | — | — | 2 | C | 4 | 10 | Balance | 45 | 1.6 | 500 | 5 | 2 |
| Comparative Example 11 | 3 | 6 | — | — | — | 2 | C | 4 | 10 | Balance | 45 | 5 | 500 | 5 | 3 |

As can be seen from Table 1, a ink discharge property was superior and unevenness in brilliance was suppressed in images, which were formed using the ink compositions (inks 1 to 9) according to the embodiment and dried at a film surface temperature of 35° C. to 55° C. such that the difference between the residual water contents was 2 g/m² and 4 gm/m².

This application claims priority under 35 U.S.C. §119 of Japanese Patent application JP 2012-044600, filed on Feb. 29, 2012, the entire contents of which are hereby incorporated by reference.

What is claimed is:

1. An image forming method using an ink set, comprising:
applying a liquid composition onto a recording medium;
applying a ink composition onto a liquid-composition-applied surface of the recording medium with an ink jet method to form an image after applying the liquid composition;
drying the image formed on the recording medium at a surface temperature of the image of 35° C. to 55° C. until a difference between a residual water content of a non-image portion on the recording medium where the ink composition is not applied and a residual water content of a portion of the image where an application amount of the ink composition is the maximum is 2 g/m² to 4 g/m² after applying the ink composition with a humidity control means combining a humidifying means and a drying means together; and
irradiating the image with active energy rays after drying the image:

the ink set includes the ink composition which contains at least a pigment, water, 3% by mass or less of polymer particles with respect to the total mass of the ink composition, and 5% by mass to 15% by mass of a polymerizable compound having an acrylamide structure represented by the following formula (1) with respect to the total mass of the ink composition; and the liquid composition which contains an aggregation component capable of aggregating the ink composition Formula (1)

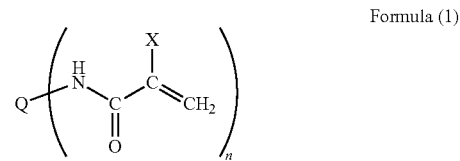

In the formula (1), Q represents a n-valent linking group; X represents $CH_3$ or H; and n represents an integer of 2 or more.

2. The image forming method according to claim 1, wherein the ink set contains a black ink.

3. The image forming method according to claim 2, wherein regarding the polymerizable compound, n in the formula (1) represents an integer of 3 or more.

4. The image forming method according to claim 2, wherein regarding the polymerizable compound, n in the formula (1) represents an integer of 4 or more.

5. The image forming method according to claim 2, wherein the polymerizable compound has an acrylamide structure represented by the following formula (2)

Formula (2)

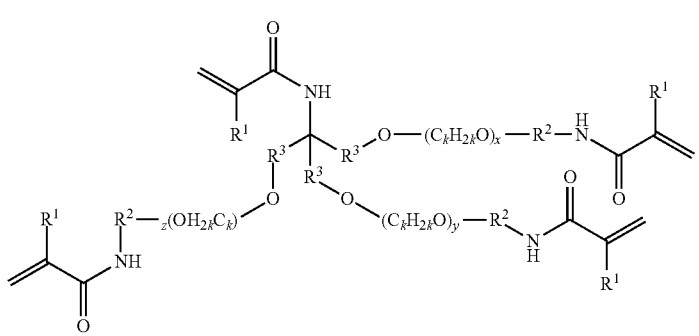

In the formula (2), $R^1$ represents a hydrogen atom or a methyl group; $R^2$ represents a linear or branched alkylene group having 2 to 4 carbon atoms; $R^3$ represents a divalent linking group; k represents 2 or 3; x, y, and z each independently represent an integer of 0 to 6; and a value of x+y+z satisfies an integer of 0 to 18.

6. The image forming method according to claim 2, wherein a transport rate of the recording medium is 300 mm/s to 1200 mm/s in drying processing.

7. The image forming method according to claim 1, wherein regarding the polymerizable compound, n in the formula (1) represents an integer of 3 or more.

8. The image forming method according to claim 1, wherein regarding the polymerizable compound, n in the formula (1) represents an integer of 4 or more.

9. The image forming method according to claim 1, wherein the polymerizable compound has an acrylamide structure represented by the following formula (2)

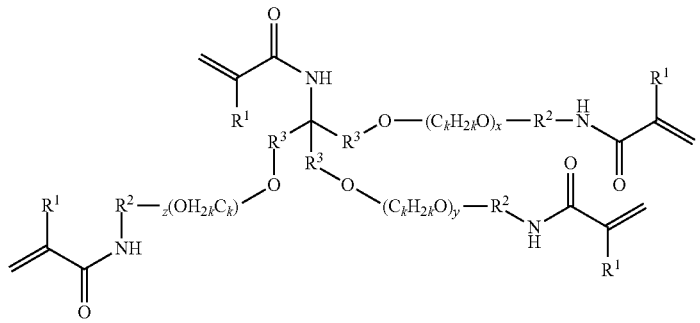

Formula (2)

In the formula (2), $R^1$ represents a hydrogen atom or a methyl group; $R^2$ represents a linear or branched alkylene group having 2 to 4 carbon atoms; $R^3$ represents a divalent linking group; k represents 2 or 3; x, y, and z each independently represent an integer of 0 to 6; and a value of x+y+z satisfies an integer of 0 to 18.

10. The image forming method according to claim 1, wherein a transport rate of the recording medium is 300 mm/s to 1200 mm/s in drying processing.

11. The image forming method according to claim 1, wherein the ink composition further contains a dispersant which disperses the pigment.

12. The image forming method according to claim 1, wherein the recording medium is a coated paper having a pigment layer on at least one surface of a support.

13. The image forming method according to claim 1, wherein humidity is controlled using a humidity sensor in drying processing.

14. The image forming method according to claim 1, wherein the humidifying means is a humidifier.

15. The image forming method according to claim 1, wherein a water content of an image cured with active energy rays and a water content of a non-image portion of the recording medium are measured using a sheet moisture meter.

16. The image forming method according to claim 1, wherein the drying means is an electric heating drier.

* * * * *